United States Patent
Harutyunyan et al.

(10) Patent No.: US 10,181,983 B2
(45) Date of Patent: Jan. 15, 2019

(54) METHODS AND SYSTEMS TO ENHANCE IDENTIFYING SERVICE-LEVEL-OBJECTIVE DEGRADATION IN A DATA CENTER

(71) Applicant: VMware, Inc., Palo Alto, CA (US)

(72) Inventors: Ashot Nshan Harutyunyan, Yerevan (AM); Naira Movses Grigoryan, Yerevan (AM); Arnak Poghosyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 218 days.

(21) Appl. No.: 15/174,017

(22) Filed: Jun. 6, 2016

(65) Prior Publication Data
US 2017/0353362 A1 Dec. 7, 2017

(51) Int. Cl.
*G06F 13/00* (2006.01)
*H04L 12/24* (2006.01)
*H04L 12/26* (2006.01)

(52) U.S. Cl.
CPC .......... *H04L 41/5016* (2013.01); *H04L 43/08* (2013.01); *H04L 43/16* (2013.01)

(58) Field of Classification Search
CPC ........... H04L 41/0213; H04L 29/08072; H04L 29/06; H04L 41/22; H04L 41/12; H04L 41/5016; H04L 43/08; H04L 43/16; G06Q 10/06393; G06Q 10/06; G06Q 10/063; G06Q 10/0639; G06Q 10/00
USPC .......................................... 705/7.39; 709/223
See application file for complete search history.

(56) References Cited

U.S. PATENT DOCUMENTS

| | | | |
|---|---|---|---|
| 7,467,067 B2 | 12/2008 | Marvasti et al. | |
| 2010/0046809 A1 | 2/2010 | Marvasti | |
| 2017/0262781 A1* | 9/2017 | Yang | ................ G06Q 10/06395 |

* cited by examiner

*Primary Examiner* — Robert B Harrell
(74) *Attorney, Agent, or Firm* — Clayton, McKay & Bailey, PC

(57) ABSTRACT

Methods recommend to data center customers those attributes of a data center infrastructure and application program that are associated with service-level objective ("SLO") metric degradation and may be recorded in problem definitions. In other words, a data center customer is offered to "codify" problems primarily with atomic abnormality conditions on indicated attributes that decrease the SLO by some degree that the data center customer would like to be aware. As a result, the data center customer is warned of potentially significant SLO decline in order to prevent unwanted loss and take any necessary actions to prevent active anomalies. Methods also generate patterns of attributes that constitute core structures highly associated with degradation of the SLO metric.

15 Claims, 23 Drawing Sheets

| Time stamps | Attribute patterns |
|---|---|
| t₁ | {A2,A3,A5} |
| t₂ | {A1,A2,A4} |
| t₃ | {A4,A5} |
| t₄ | {A1,A2,A3} |
| t₅ | {A2,A3,A4} |
| t₆ | {A2,A3,A5} |
| t₇ | {A2,A4} |
| t₉ | {A1,A2,A3,A5} |
| t₁₀ | {A2,A3} |
| t₁₁ | {A1,A2,A4,A5} |
| t₁₃ | {A2,A3,A5} |
| t₁₄ | {A1,A3,A4,A5} |

1102

1104

Attribute combinations

| Attribute pairs | Attribute triplets | Attribute quadruplets |
|---|---|---|
| {A1,A2} | {A1,A2,A3} | {A1,A2,A3,A4} |
| {A1,A3} | {A1,A2,A4} | {A1,A2,A3,A5} |
| {A1,A4} | {A1,A2,A5} | {A1,A2,A4,A5} |
| {A1,A5} | {A1,A3,A4} | {A1,A3,A4,A5} |
| {A2,A3} | {A1,A3,A5} | {A2,A3,A4,A5} |
| {A2,A4} | {A1,A4,A5} | |
| {A2,A5} | {A2,A3,A4} | |
| {A3,A4} | {A2,A3,A5} | |
| {A3,A5} | {A2,A4,A5} | |
| {A4,A5} | {A3,A4,A5} | |

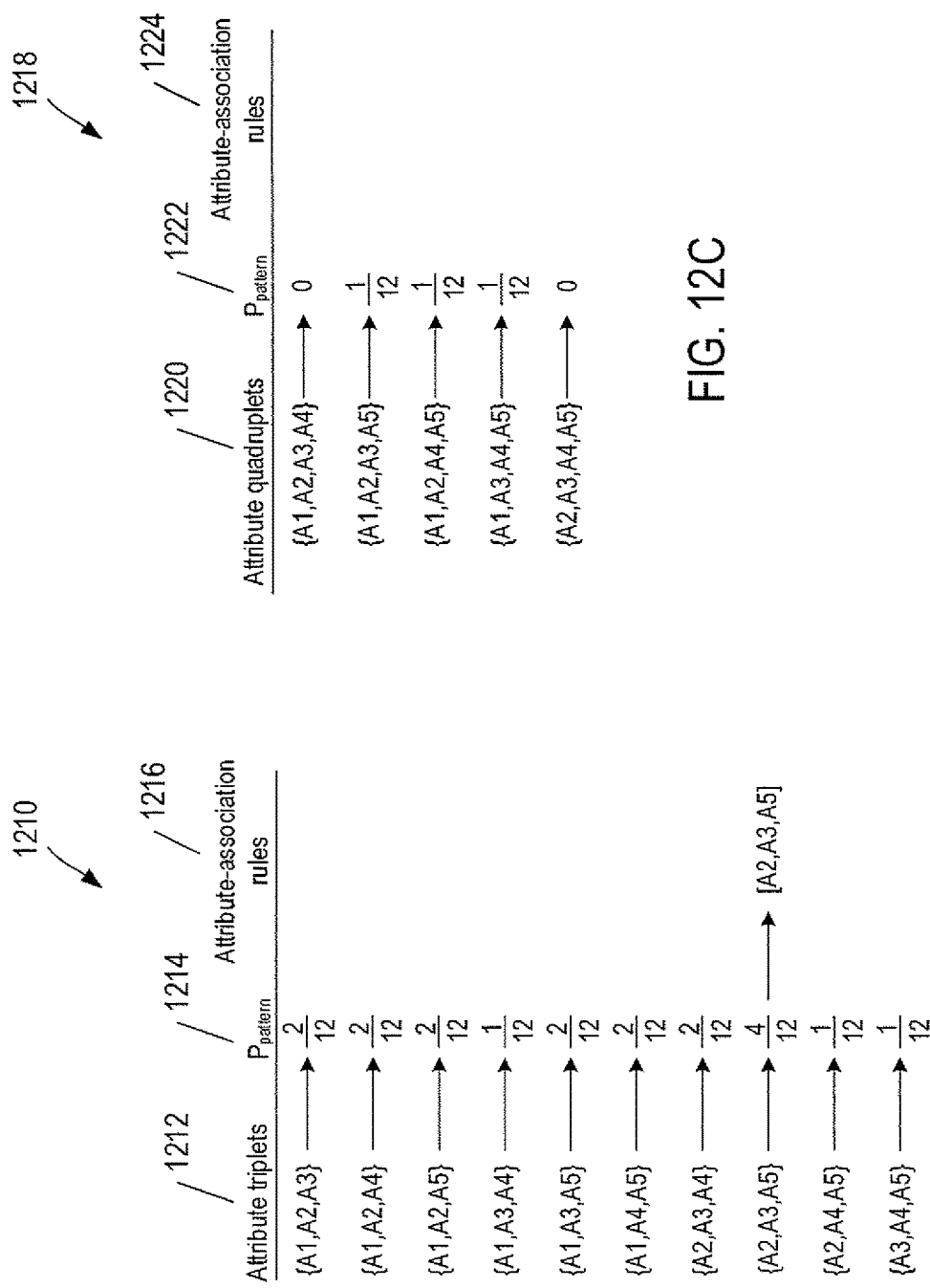

| Attribute Name | Correlation Score | MAE | RMSE |
|---|---|---|---|
| guestfilesystem\|percentage | 0.069515329 | 69.27306962 | 21.60331492 |
| guestfilesystem\|usage | 0.039960315 | 70.57748417 | 22.61211189 |
| diskspace\|activeNotShared | 0.035213034 | 72.51677391 | 18.95279549 |
| net\|bytesTx_average | 0.033532347 | 73.73089287 | 24.49056126 |
| cpu\|usagemhz_average | 0.032520415 | 74.15538118 | 30.6764751 |
| net\|transmitted_average | 0.027097779 | 74.60375061 | 24.49056126 |
| cpu\|idle_summation | 0.027055982 | 72.73632003 | 29.06165204 |
| cpu\|used_summation | 0.027025184 | 73.9015873 | 29.60117031 |
| net\|usage_average | 0.026134244 | 72.33703704 | 27.79802596 |
| cpu\|readyPct | 0.02158055 | 71.1617737 | 24.34258644 |
| cpu\|ready_summation | 0.02158055 | 71.1617737 | 24.34258644 |
| cpu\|wait_summation | 0.021327567 | 71.9719443 | 29.07785985 |
| net\|packetsTxPerSec | 0.019558886 | 70.77449106 | 20.45256233 |
| net\|received_average | 0.019013322 | 73.30718501 | 30.07037915 |
| net\|packetsRxPerSec | 0.018766939 | 73.3249326 | 34.96926952 |
| datastore\|write_average | 0.018390764 | 74.2972488 | 24.36028461 |
| guestfilesystem\|freespace_total | 0.018333568 | 70.33813295 | 22.91046567 |
| datastore\|maxObserved_Write | 0.018236774 | 78.09529554 | 24.19758745 |
| guestfilesystem\|usage_total | 0.018091584 | 71.15673638 | 23.0043785 |
| guestfilesystem\|percentage_total | 0.018047587 | 70.57081911 | 22.67926829 |
| diskspace\|used | 0.017499824 | 72.50207417 | 18.98566398 |
| mem\|host_usage | 0.016316304 | 71.23634893 | 23.6698584 |
| net\|bytesRx_average | 0.016122717 | 71.82139446 | 30.07037915 |
| datastore\|maxObserved_NumberWrite | 0.016045722 | 78.0128873 | 20.73320537 |
| mem\|guest_usage | 0.014745609 | 70.91660451 | 23.22265334 |
| mem\|consumed_average | 0.014745609 | 70.91660451 | 23.22265334 |
| datastore\|totalLatency_average | 0.014629017 | 72.99518797 | 36.62518968 |
| mem\|guest_dynamic_entitlement | 0.014059255 | 70.79987482 | 23.18607932 |
| mem\|shared_average | 0.013641283 | 71.34623448 | 26.79996774 |
| virtualDisk\|commandsAveraged_average | 0.013350903 | 69.04448838 | 29.49126638 |
| cpu\|numberToRemove | 0.013183714 | 74.86183881 | 25.68463207 |
| datastore\|commandsAveraged_average | 0.013141917 | 69.37931034 | 30.98793161 |
| disk\|usage_average | 0.01293953 | 72.95239714 | 32.37131231 |
| datastore\|maxObserved_NumberRead | 0.012530358 | 78.16994382 | 31.19803371 |
| virtualDisk\|totalReadLatency_average | 0.012402767 | 78.46541327 | 33.53739445 |
| virtualDisk\|numberWriteAveraged_average | 0.012312573 | 74.32535287 | 35.39077299 |
| cpu\|swapwait_summation | 0.011584422 | 69.04785416 | 23.8504902 |
| virtualDisk\|usage | 0.011404034 | 73.06635802 | 33.78087081 |

FIG. 19

| Size | Rules | Participation Rate | SLO Degradation | Co-Occurrence |
|---|---|---|---|---|
| 2 | [guestfilesystem\|percentage, guestfilesystem\|usage] | 0.695 | 69.27 | 22 |
| | [guestfilesystem\|percentage, net\|bytesTx_average] | 0.396 | 69.27 | 24 |
| | [cpu\|usagemhz_average, guestfilesystem\|percentage] | 0.362 | 69.27 | 30 |
| | [cpu\|usagemhz_average, net\|bytesTx_average] | 0.232 | 73.73 | 35 |
| | [cpu\|usagemhz_average, diskspace\|activeNotShared] | 0.216 | 72.51 | 28 |
| | [diskspace\|activeNotShared, net\|bytesTx_average] | 0.20 | 72.51 | 22 |
| 3 | [diskspace\|activeNotShared, guestfilesystem\|percentage, guestfilesystem\|usage] | 0.44 | 69.27 | 21 |
| | [guestfilesystem\|percentage, guestfilesystem\|usage, net\|bytesTx_average] | 0.4 | 69.27 | 24 |
| | [cpu\|usagemhz_average, guestfilesystem\|percentage, guestfilesystem\|usage] | 0.37 | 69.27 | 30 |
| | [cpu\|usagemhz_average, guestfilesystem\|percentage, net\|bytesTx_average] | 0.2 | 69.27 | 35 |
| 4 | [cpu\|usagemhz_average, diskspace\|activeNotShared, guestfilesystem\|percentage, guestfilesystem\|usage] | 0.22 | 69.27 | 28 |
| | [diskspace\|activeNotShared, guestfilesystem\|percentage, guestfilesystem\|usage, net\|bytesTx_average] | 0.201 | 69.27 | 23 |
| | [cpu\|usagemhz_average, guestfilesystem\|percentage, guestfilesystem\|usage, net\|bytesTx_average] | 0.20 | 69.27 | 35 |
| 5 | [cpu\|usagemhz_average, diskspace\|activeNotShared, guestfilesystem\|percentage, guestfilesystem\|usage, net\|bytesTx_average] | 0.17 | 69.27 | 36 |

FIG. 20

| Attribute Name | Other Attributes in the Rule |
|---|---|
| guestfilesystem\|percentage | guestfilesystem\|usage, guestfilesystem\|usage_total, guestfilesystem\|percentage_total, guestfilesystem\|freespace_total, diskspace\|activeNotShared |
| cpu\|usagemhz_average | cpu\|used_summation, cpu\|numberToRemove, virtualDisk\|usage, virtualDisk\|totalReadLatency_average, datastore\|maxObserved_Write |
| cpu\|idle_summation | guestfilesystem\|percentage, guestfilesystem\|usage, cpu\|wait_summation, cpu\|usagemhz_average, cpu\|used_summation] |

FIG. 21

METHODS AND SYSTEMS TO ENHANCE IDENTIFYING SERVICE-LEVEL-OBJECTIVE DEGRADATION IN A DATA CENTER

TECHNICAL FIELD

The present disclosure is directed to identifying problems in a data center based on performance of application programs running in the data center.

BACKGROUND

Cloud-computing facilities provide computational bandwidth and data-storage services much as utility companies provide electrical power and water to consumers. Cloud computing provides enormous advantages to customers without the devices to purchase, manage, and maintain in-house data centers. Such customers can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, customers can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a customer.

In order to maintain a data center infrastructure and satisfy the computational and data storage demands of customers, data center managers typically rely on cloud management products to monitor operation of the data center infrastructure. But most cloud management products do not adequately bridge the gap between defined data center infrastructure problems and application performance problems. For example, a number of cloud management products allow customers to manually select the types of abnormal conditions that customers perceive as precursors to important deviations from normal operations of their respective applications and receive alerts when abnormal conditions arise. Other cloud management products allow customers to define an alert definition workspace and alert workflow to follow when abnormal conditions occur. By allowing customers to select the types of abnormal conditions in advance assumes that the customer-defined abnormal conditions will also impact data center operations that are worth paying attention to and as a result provide a user-controlled warning system. However, customer-defined abnormal conditions do not identify objects of the data center, such as virtual and physical machine components, that may be responsible for abnormal operations of their applications. Moreover, a customer-define abnormal conditions creates issues in terms of unrealistic manual and ad-hoc configuration efforts for large-scale data centers that are not tractable by expert knowledge. As a result, customer-defined abnormal conditions may increase the risk of high rates of missed and false negative alerts with respect to data center operations.

SUMMARY

Service-level objectives ("SLOs") between a data center service provider and a data center customer are described in a service-level agreement ("SLA"). The SLOs are agreed to by the service provider and the customer and the SLOs are quantified in an SLO metric that serves as a key performance indicator of the level of services provided by the cloud computing service provider. Methods described in the present disclosure identify attributes of a data center infrastructure and application program that are associated with SLO metric degradation and may be recorded in problem definitions. In other words, a data center customer is offered to "codify" problems with atomic abnormality conditions on indicated attributes that are able to decrease the SLO by some degree that the data center customer would like to be aware. As a result, the data center customer may be warned of potentially significant SLO decline in order to prevent unwanted loss and take actions to prevent active anomalies. Methods are also generate patterns of attributes that constitute core structures highly associated with degradation of the SLO metric.

DESCRIPTION OF THE DRAWINGS

FIG. 11 shows a table of the attribute patterns and associated time stamps.
FIGS. 12A-12C show an example of determining attribute-association rules from attribute patterns and attribute combinations.
FIGS. 19-21 show tables of experimental results.

DETAILED DESCRIPTION

Figure 1:
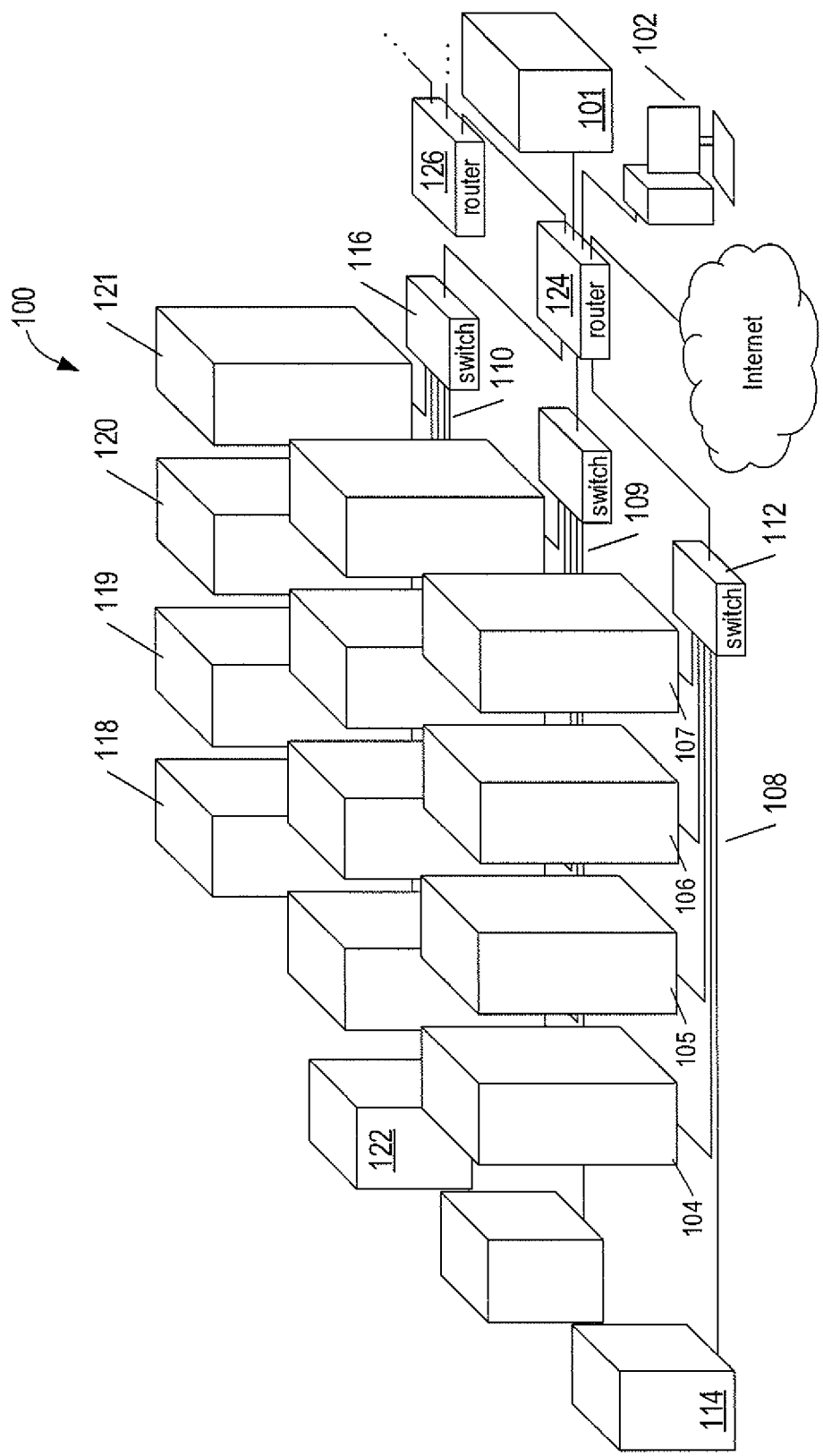
FIG. 1 shows an example of a cloud-computing facility.

FIG. 1 shows an example of a cloud-computing facility 100. The cloud-computing facility 100 consists of a virtualdata-center management server 101 and a PC 102 on which a virtual-data-center management interface may be displayed to system administrators and other users. The cloud-computing facility 100 additionally includes a number of hosts or server computers, such as server computers 104-107, that are interconnected to form three local area networks 108-110. For example, local area network 108 includes a switch 112 that interconnects the four servers 104-107 and a mass-storage array 114 via Ethernet or optical cables and local area network 110 includes a switch 116 that interconnects four servers 118-1121 and a mass-storage array 122 via Ethernet or optical cables. In this example, the cloud computing infrastructure 100 also includes a router 124 that interconnects the LANs 108-110 and interconnects the LANS to the Internet, the virtual-data-center management server 101, the PC 102 and to a router 126 that, in turn, interconnects other LANs composed of server computers and mass-storage arrays (not shown). In other words, the routers 124 and 126 are interconnected to form a larger network of server computers.

Figure 2:
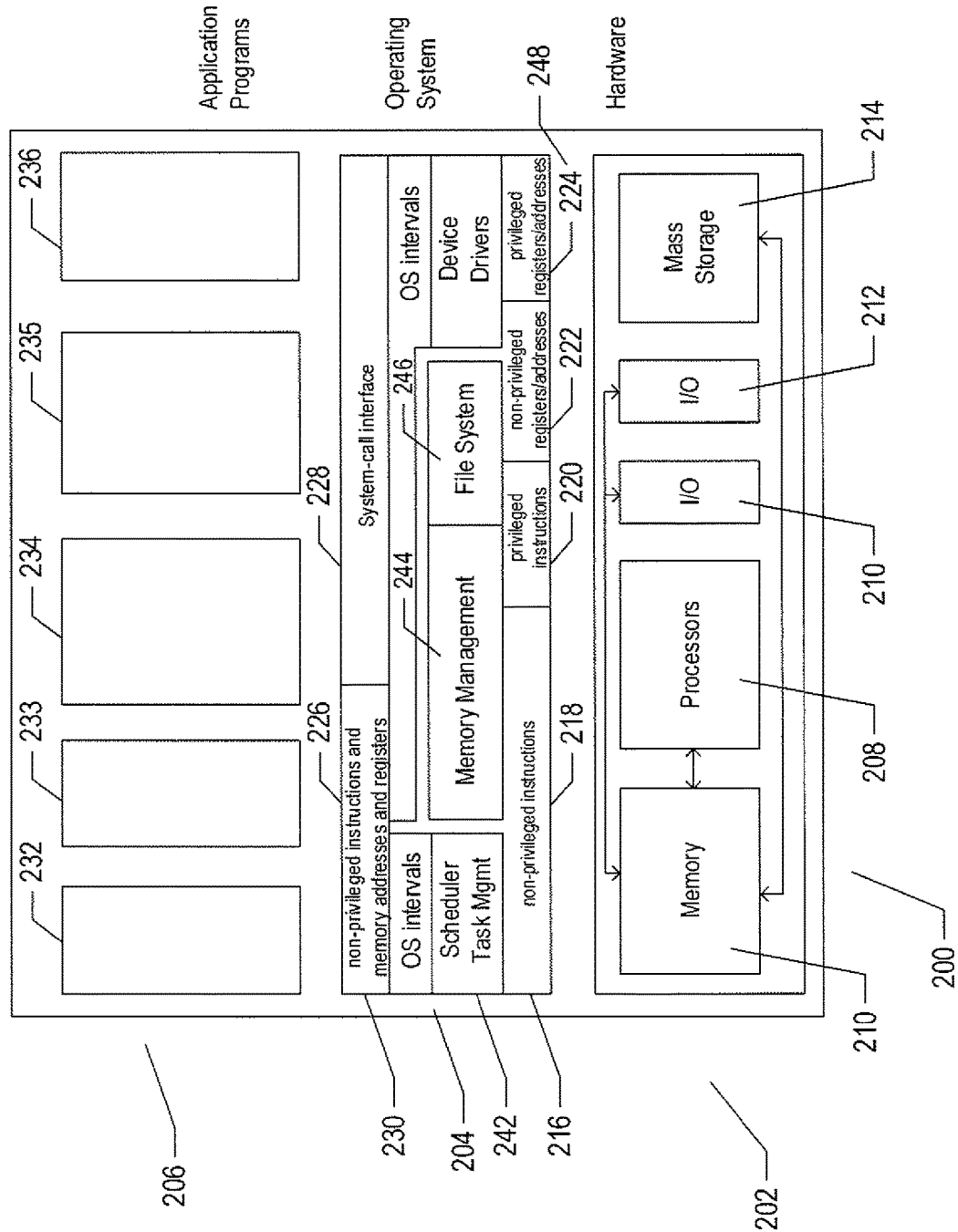
FIG. 2 shows generalized hardware and software components of a server computer.

FIG. 2 shows generalized hardware and software components of a server computer. The server computer 200 includes three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules.

To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 246 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3A:
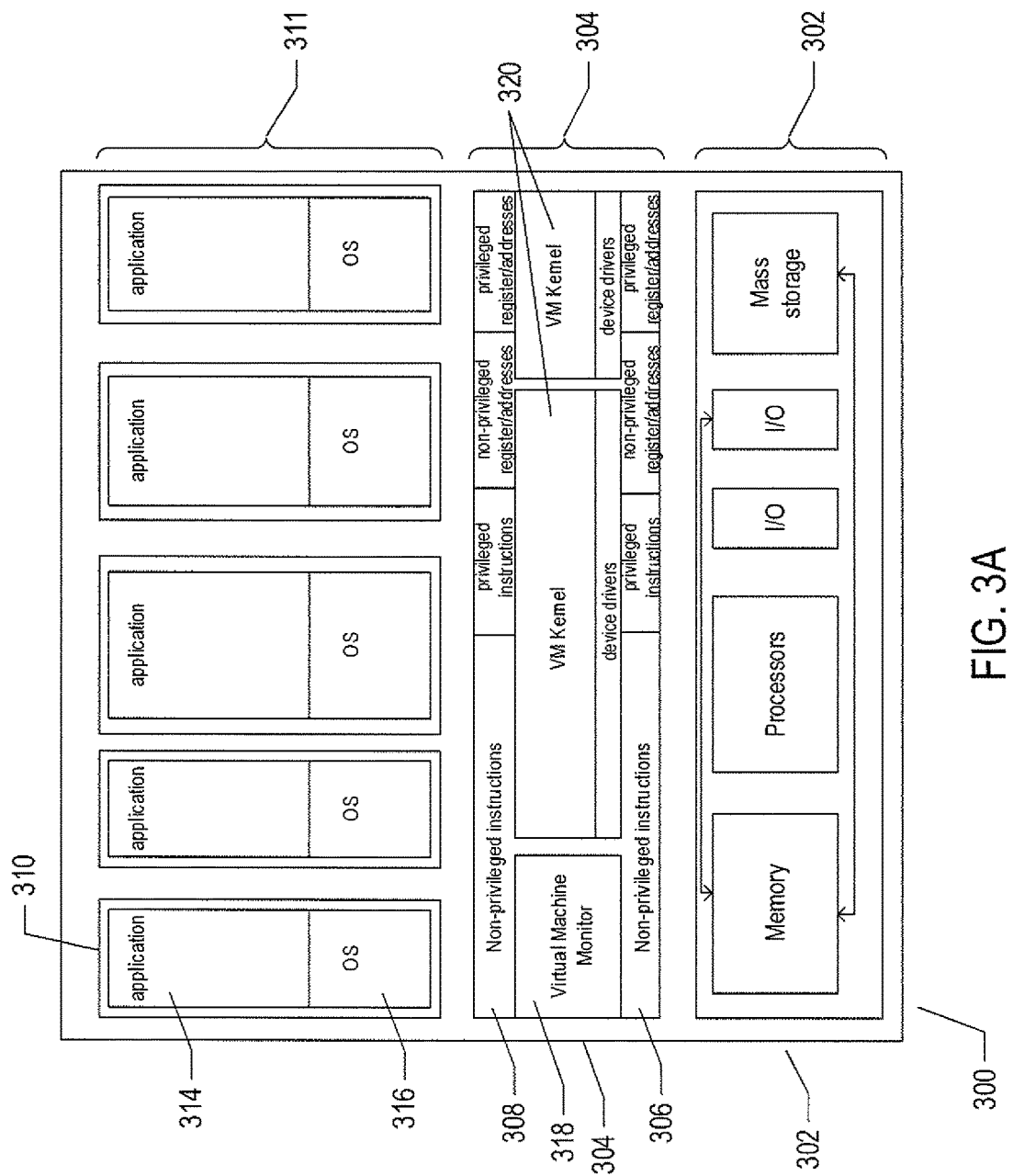
FIGS. 3A-3B show two types of virtual machines and virtual-machine execution environments.
Figure 3B:
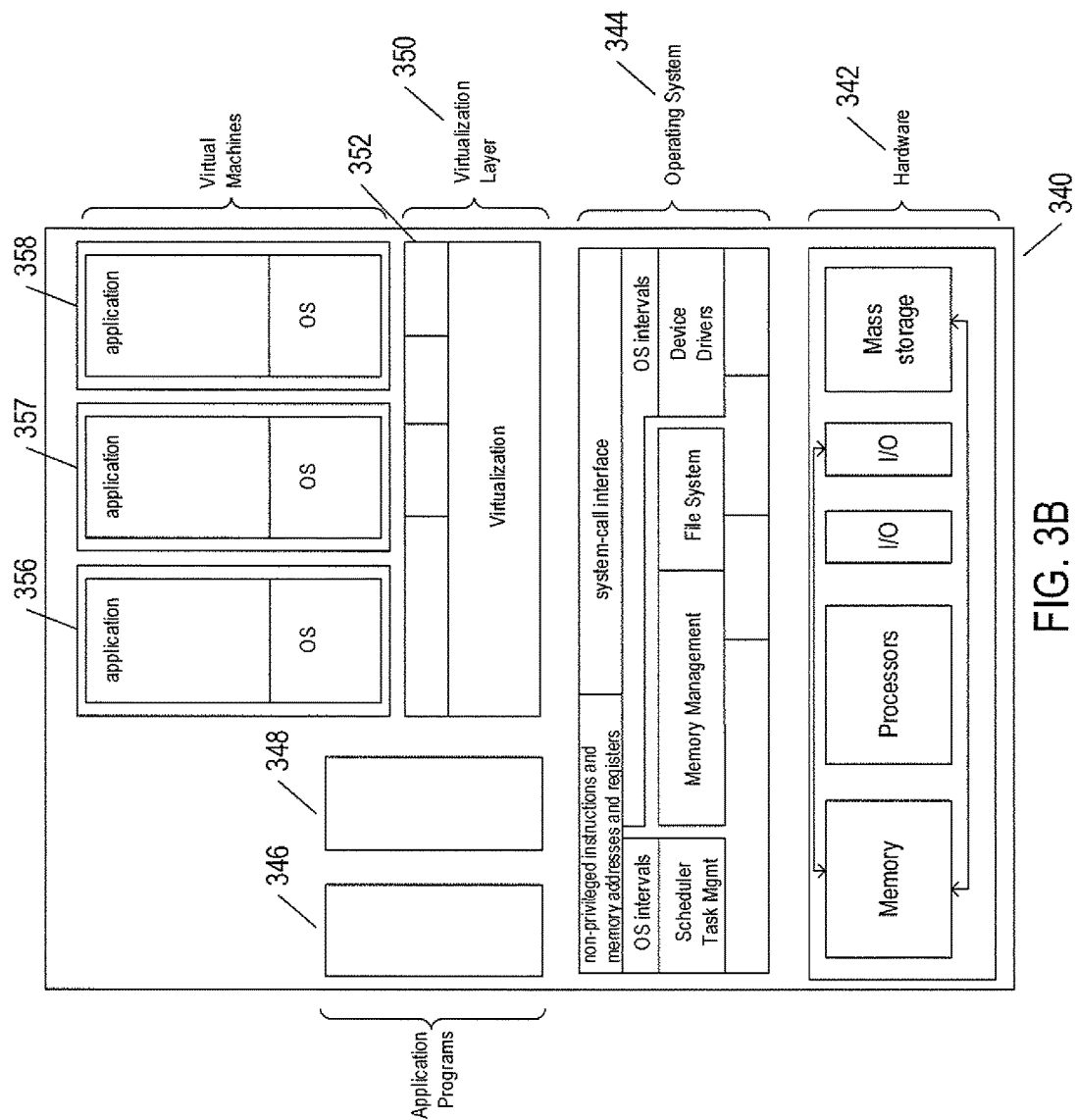

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 3A-3B show two types of VM and virtual-machine execution environments. FIGS. 3A-3B use the same illustration conventions as used in FIG. 2. FIG. 3A shows a first type of virtualization. The server computer 300 in FIG. 3A includes the same hardware layer 302 as the hardware layer 202 shown in FIG. 2. However, rather than providing an operating system layer directly above the hardware layer, as in FIG. 2, the virtualized computing environment shown in FIG. 3A features a virtualization layer 304 that interfaces through a virtualization-layer/hardware-layer interface 306, equivalent to interface 216 in FIG. 2, to the hardware. The virtualization layer 304 provides a hardware-like interface 308 to a number of VMs, such as VM 310, in a virtual-machine layer 311 executing above the virtualization layer 304. Each VM includes one or more application programs or other higher-level computational entities packaged together with an operating system, referred to as a "guest operating system," such as application 314 and guest operating system 316 packaged together within VM 310. Each VM is thus equivalent to the operating-system layer 204 and application-program layer 206 in the general-purpose computer system shown in FIG. 2. Each guest operating system within a VM interfaces to the virtualization-layer interface 308 rather than to the actual hardware interface 306. The virtualization layer 304 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 304 ensures that each of the VMs currently executing within the virtual environment receive a fair allocation of underlying hardware devices and that all VMs receive sufficient devices to progress in execution. The virtualization-layer interface 308 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 304 includes a virtual-machine-monitor module 318 that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 308, the accesses result in execution of virtualization-layer code to simulate or emulate the privileged devices. The virtualization layer additionally includes a kernel module 320 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 304 essentially schedules execution of VMs much like an operating system schedules execution of application programs, so that the VMs each execute within a complete and fully functional virtual hardware layer.

FIG. 3B shows a second type of virtualization. In FIG. 3B, the server computer 340 includes the same hardware layer 342 and operating system layer 344 as the hardware layer 202 and the operating system layer 204 shown in FIG. 2. Several application programs 346 and 348 are shown running in the execution environment provided by the operating system 344. In addition, a virtualization layer 350 is also provided, in computer 340, but, unlike the virtualization layer 304 discussed with reference to FIG. 3A, virtualization layer 350 is layered above the operating system 344, referred to as the "host OS," and uses the operating system interface to access operating-system-provided functionality as well as the hardware. The virtualization layer 350 comprises primarily a VMM and a hardware-like interface 352, similar to hardware-like interface 308 in FIG. 3A. The virtualization-layer/hardware-layer interface 352, equivalent to interface 216 in FIG. 2, provides an execution environment for a number of VMs 356-358, each including one or more application programs or other higher-level computational entities packaged together with a guest operating system.

In FIGS. 3A-3B, the layers are somewhat simplified for clarity of illustration. For example, portions of the virtualization layer 350 may reside within the host-operating-system kernel, such as a specialized driver incorporated into the host operating system to facilitate hardware access by the virtualization layer.

Figure 4:
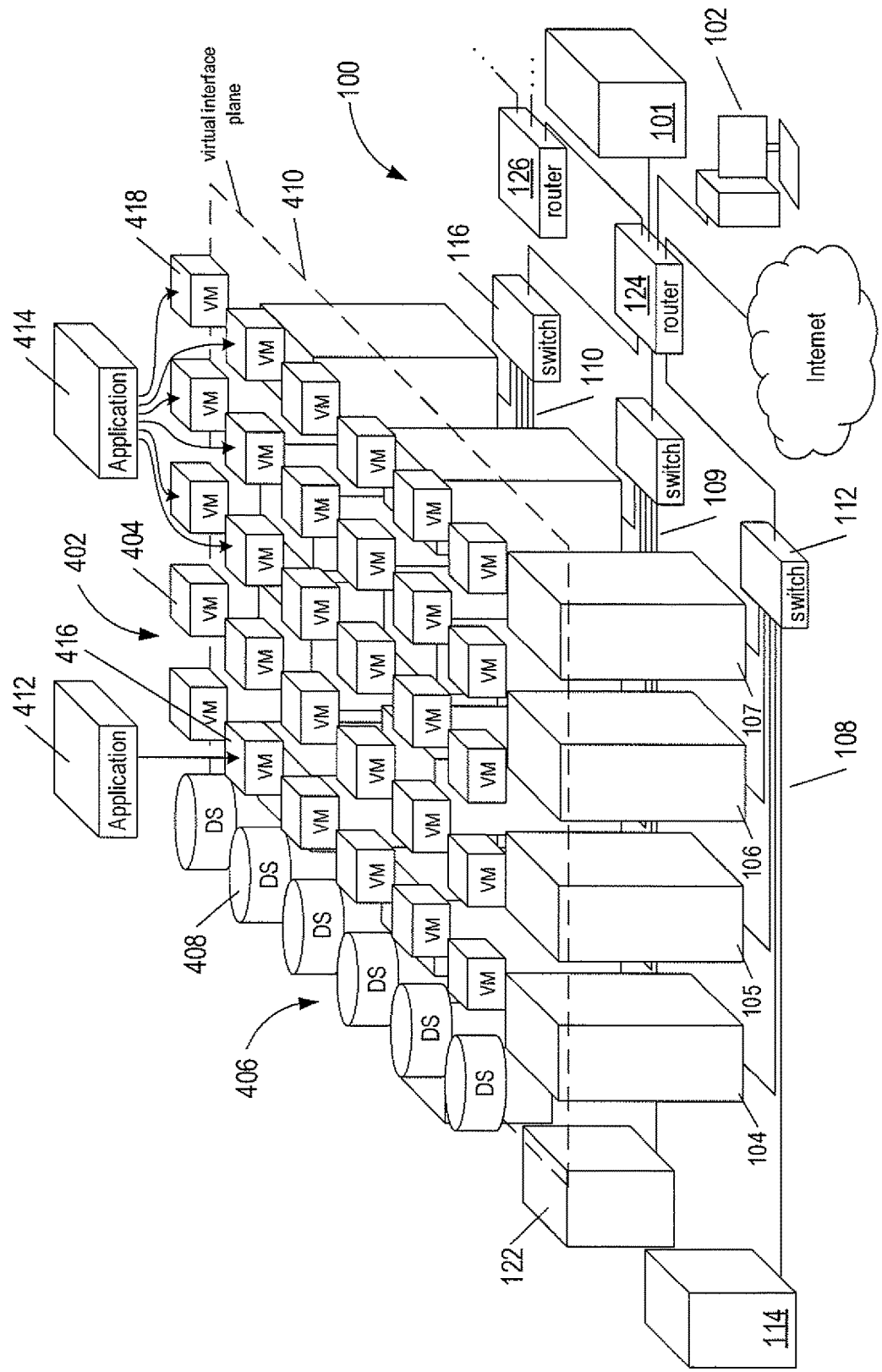
FIG. 4 shows an example set of virtual machines and datastores above a virtual interface plane in a cloud-computing facility.

FIG. 4 shows an example set of VMs 402, such as VM 404, and a set of datastores ("DS") 406, such as DS 408, above a virtual interface plane 410. The virtual interface plane 410 represents a separation between a physical resource level that comprises the server computers and mass-data storage arrays and a virtual resource level that comprises the VMs and DSs. The set of VMs 402 may be partitioned to run on different server computers, and the set of DSs 406 may be partitioned on different mass-storage arrays. Because the VMs are not bound physical devices, the VMs may be moved to different server computers in an attempt to maximize efficient use of the cloud-computing infrastructure 100 resources. For example, each of the server computers 104-107 may initially run three VMs. However, because the VMs have different workloads and storage requirements, the VMs may be moved to other server computers with available data storage and computational resources. Certain VMs may also be grouped into resource pools. For example, suppose a host is used to run five VMs and a first department of an organization uses three of the VMs and a second department of the same organization uses two of the VMs. Because the second department needs larger amounts of CPU and memory, a systems administrator may create one resource pool that comprises the three VMs used by the first department and a second resource pool that comprises the two VMs used by the second department. The second resource pool may be allocated more CPU and memory to meet the larger demands. FIG. 4 shows two application programs 412 and 414. Application program 412 runs on a single VM 416. On the other hand, application program 414 is a distributed application that runs on six VMs, such as VM 418.

A service-level agreement ("SLA") between a data center customer and a data center service provider is a contractual agreement that outlines specific service objectives to be provided by the cloud computing service provider to the customer. The SLA describes the services, financial aspects of service delivery, and specific performance metrics that govern service delivery. The SLA describes service-level objectives ("SLOs") that are agreed upon by the service provider and the customer as a means of measuring the performance of the services. An SLO metric may be any individual performance metric or combination of performance metrics that the customer selects as a key performance indicator of the services provided by the cloud computing service provider. The SLO metric may be compared with an SLO threshold, denoted by $T_{SLO}$, that represents when the SLOs are violated.

Equations (1a)-(1e) below are examples of SLO metrics. An SLO metric may be calculated as a sum of performance metrics:

$$SLOmetric(t) = \sum_{j=1}^{J} metric_j(t) \tag{1a}$$

where
t is a time stamp;
$metric_j(t)$ is the jth performance metric generated at time stamp t; and
J is the number of performance metrics.

An SLO metric may be an average of performance metrics generated at each time stamp:

$$SLOmetric(t) = \frac{1}{J}\sum_{j=1}^{J} metric_j(t) \tag{1b}$$

An SLO metric may be the largest performance metric generated at each time stamp:

$$SLOmetric(t) = \max\{metric_j(t)\}_{j=1}^{J} \tag{1c}$$

An SLO metric may be the smallest performance metric generated at each time stamp:

$$SLOmetric(t) = \min\{metric_j(t)\}_{j=1}^{J} \tag{1d}$$

An application program response time may be used as an SLO metric at each time stamp:

$$SLOmetric(t) = responseTime(t) \tag{1e}$$

Figure 5:
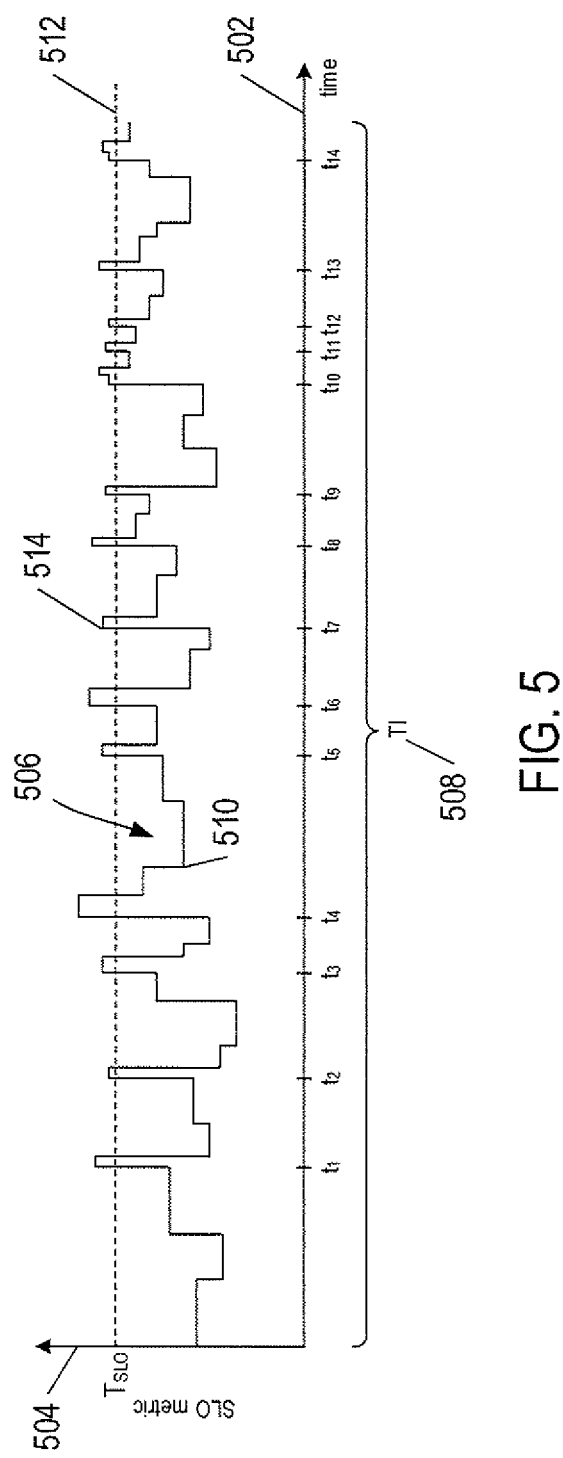
FIG. 5 shows a plot of a service-level objective ("SLO") metric generated for an application program running in a cloud computing facility.

FIG. 5 shows a plot of an SLO metric generated for an application program running in a data center in a time window of duration TI. Horizontal axis 502 represents time. Vertical axis 504 represents an SLO metric value. Curve 506 represent values of an SLO metric at time stamps within the time window 508. For example, point 510 is an SLO metric value at a particle time stamp. Dashed line 512 represents an SLO threshold that is used to determine when the SLO is violated. The SLO threshold may be a hard threshold or a dynamic threshold. Time axis 502 includes fourteen marks labeled by $t_i$, where i=1, . . . 14 that represent time stamps when the SLO metric violates the threshold 512. For example, the SLO metric 514 that violates the threshold 512 at a time stamp $t_7$ is denoted by $SLOmetric(t_7)$. A single violation of the SLO threshold at a time stamp is also called an atomic anomaly. The SLO threshold 512 represents a limit on normal behavior. When an atomic anomaly occurs, such as when the SLO metric 514 violates the threshold 512, an alert may be generated.

Attributes of objects used to run an application program in data center are recorded in the same time window TI. An object may be one or more VMs used to run the application program. For example, suppose a number of VMs are used to run an application program. Each the VMs have the same set of attributes. The attributes of a VM include CPU usage, memory usage, and network usage. Each attribute is represented as time series data and used as attribute performance indicators. For example, three attributes of a VM are time series data of CPU usage, memory usage, and network bandwidth.

Figure 6:
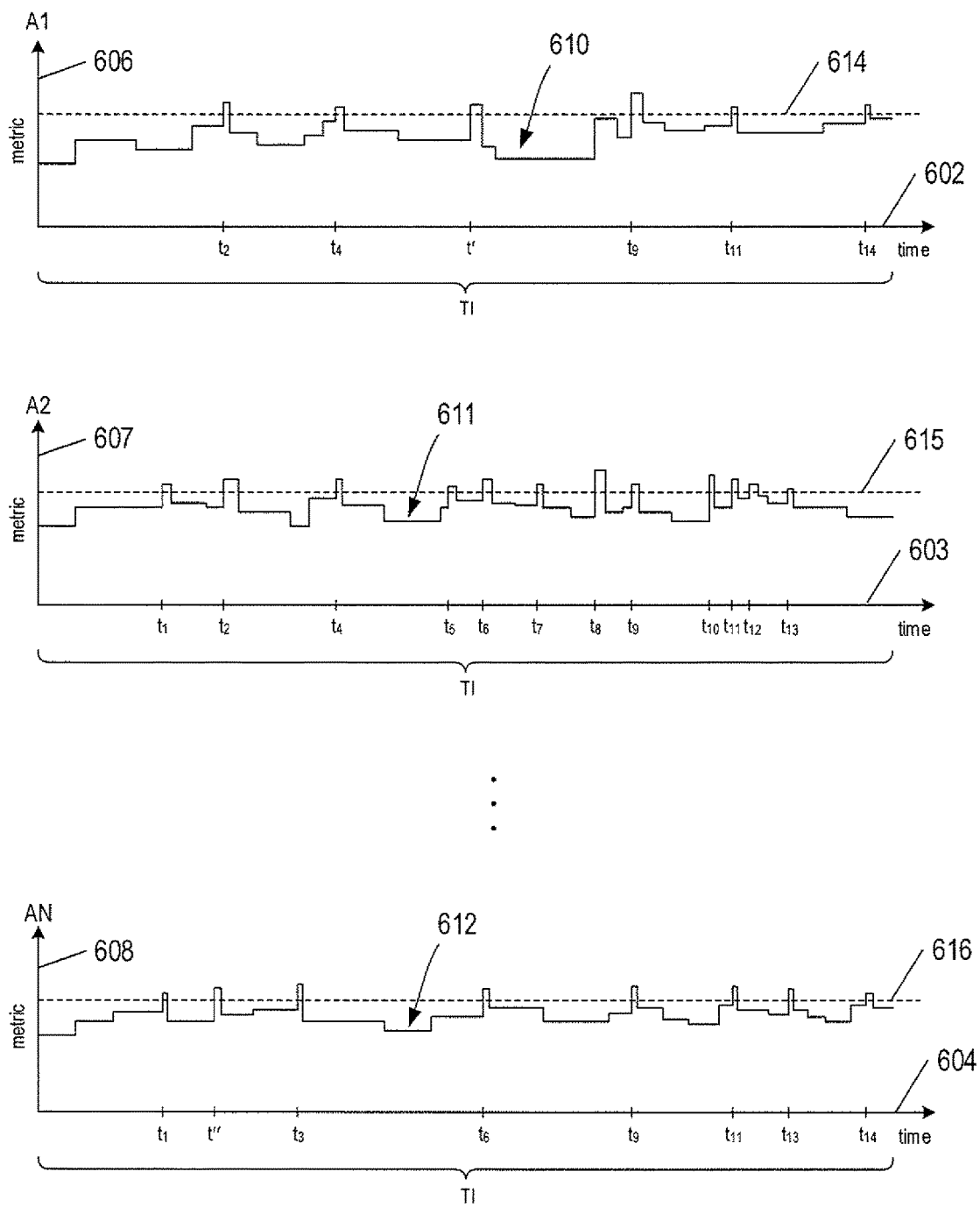
FIG. 6 shows a plot of attributes.

FIG. 6 shows plots of three attributes of N attributes used to run the application program with SLO metric plotted in FIG. 5. The attributes are denoted by An, where n=1, . . . , N, and the attributes are collected in the same time window TI as the SLO metric shown in FIG. 5. Horizontal axes 602-604 represent time. Vertical axes 606-608 represent metric values. Curves 610-612 represent attributes. For example, attribute A1 may be CPU usage and curve 610 is time series data of CPU usage, attribute A2 may be memory usage and curve 611 is time series data memory usage, and attribute AN may I/O network usage and curve 612 is time series data the network bandwidth. Dashed lines 614-616 represent attribute thresholds associated with each attribute. The time axes 602-604 also include time stamps $t_i$ that represent when an attribute violates an attribute threshold. For example, attributes 610 and 611 violate their associated attribute thresholds 614 and 615 at time stamp $t_2$. An attribute violation of an associated attribute threshold at a time stamp is also called an atomic anomaly. Atomic anomalies occur at different time stamps but the time stamps may correspond to the time stamps when the SLO metric violates the SLO threshold. For example, attributes A2 and AN both violate their associated attribute thresholds at time stamp $t_2$, which corresponds to the SLO metric violation of the SLO threshold at time stamp $t_2$ in FIG. 5. On the other hand, it may be the case that attributes violate associated attribute thresholds at time stamps that do not correspond to any of the time stamps when the SLO metric violates the SLO threshold. For example, attributes A1 violates associated attribute threshold 614 at time stamp t' and attribute AN violates associated attribute threshold 616 at time stamp t". However, neither of the time stamps t' and t" corresponds to an SLO metric violation of the SLO threshold.

Note that although embodiments are described below for the SLO threshold of FIG. 5 and attribute thresholds of FIG. 6 are represented as upper bounds or limits on normal behavior, methods described below may be used with an SLO threshold and attribute thresholds that are lower bounds or limits on normal behavior. In other words, embodiments are not intended to be limited to the SLO threshold of FIG. 5 and attribute thresholds of FIG. 6 that represented upper bounds or limits on normal behavior.

Methods calculate a participation rate, SLO metric degradation rate, and co-occurrence rate for each attribute over the time window for time stamps that correspond to both attribute violations of an attribute threshold and SLO metric violations of an SLO threshold. The participation rate is a measure how much, or what portion of, an attribute's attribute threshold violations correspond to the number of SLO threshold violations in the time window. For each attribute, a participation rate may be calculated as the fraction of occurrences an attribute violates an associated attribute threshold that correspond to the number of SLO metric violations of the SLO threshold:

$$Part_{rate}(An) = \frac{count(TS(An) \cap SLO\_metric\_viol)}{count(SLO\_metric\_viol)} \tag{2}$$

where
TS(An) is the set of time stamps when attribute An violates the associated attribute threshold in the time window TI;

SLO_metric_viol is the set of time stamps when the SLO metric violates SLO threshold in the time window TI;
∩ represents intersection; and
count( ) is a count function that counts the number of elements in a set.

Figure 7:
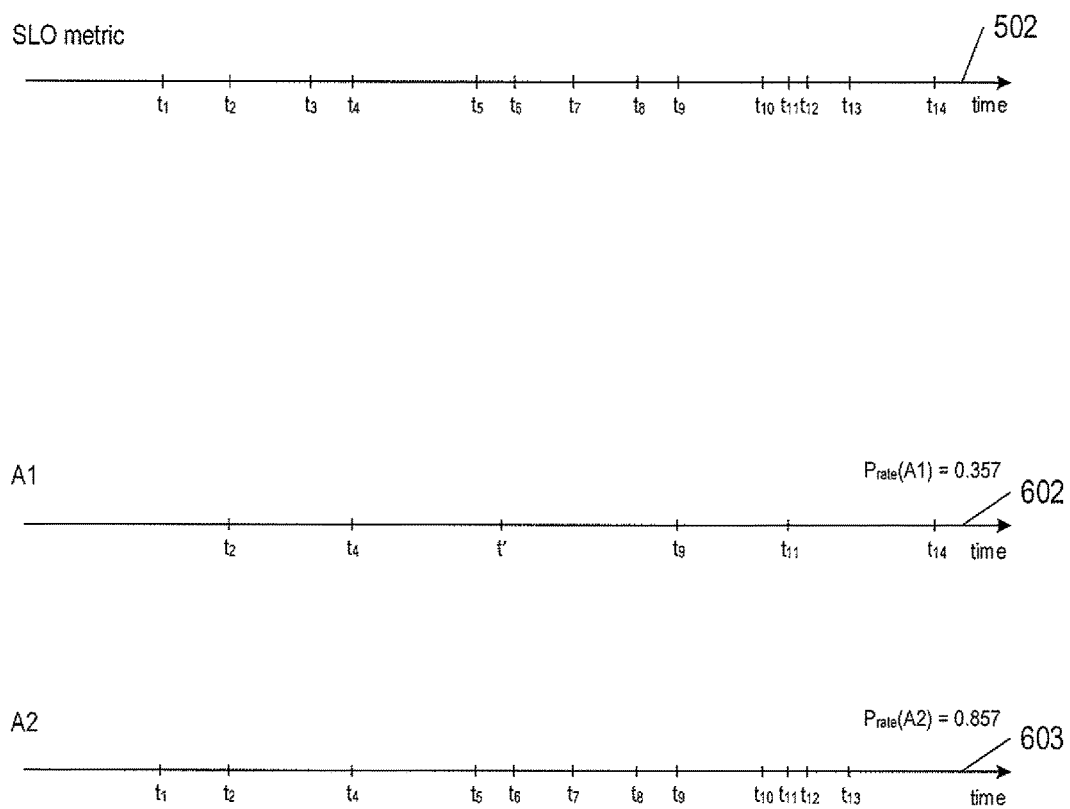
FIG. 7 shows plots of time stamps at which attribute violations of associated attribute thresholds occur and associated participation rates.

FIG. 7 shows time stamps of attribute violations of associated attribute thresholds for five attributes and time stamps of SLO metric violations of the SLO threshold. FIG. 7 shows the time axis 502 of the SLO metric and the fourteen time stamps of the SLO metric violations of the SLO threshold described above with reference to FIG. 5 and the time axes 602-604 of the attribute violations of the attribute thresholds described above with reference to FIG. 6. The participation rates of the attributes are calculated according to Equation (2). For example, the set of time stamps of the attribute A1 with attribute violations of the associated attribute threshold that correspond to time stamps in the set of time stamps of the SLO metric violation is given by $$TS(A1) \cap SLO\_metric\_viol = \{t_2, t_4, t_9, t_{11}, t_{14}\}$$

where $$TS(A1) = \{t_2, t_4, t', t_9, t_{11}, t_{14}\}; \text{ and}$$

$$SLO\_metric\_viol = \{t_1, t_2, t_3, t_4, t_5, t_6, t_7, t_8, t_9, t_{10}, t_{11}, t_{12}, t_{13}, t_{14}\}.$$

The counts are $$count(TS(An) \cap SLO\_metric\_viol) = 5$$

and $$count(SLO\_metric\_viol) = 14$$

which gives a participation rate of $P_{rate}(A1)=0.357$. The participation rate of the attribute A2 is $P_{rate}(A2)=0.857$. For example, $P_{rate}(A1)=0.357$ indicates that attribute A1 corresponds to about 35% of the SLO threshold violations and $P_{rate}(A2)=0.857$ indicates that attribute A2 corresponds to about 85% of the SLO threshold violations.

For each attribute, an attribute's ability to degrade the performance of an application is calculated as an average value of the SLO metric at the time stamps when both the SLO metric violates the SLO threshold and the attribute violates the attribute threshold:

$$SLOmetric_{deg\_rate}(An) = \frac{1}{count(T)} \sum_{t \in T} SLOmetric(t) \quad (3)$$

where $$T = TS(An) \cap SLO\_metric\_viol.$$

Figure 8:
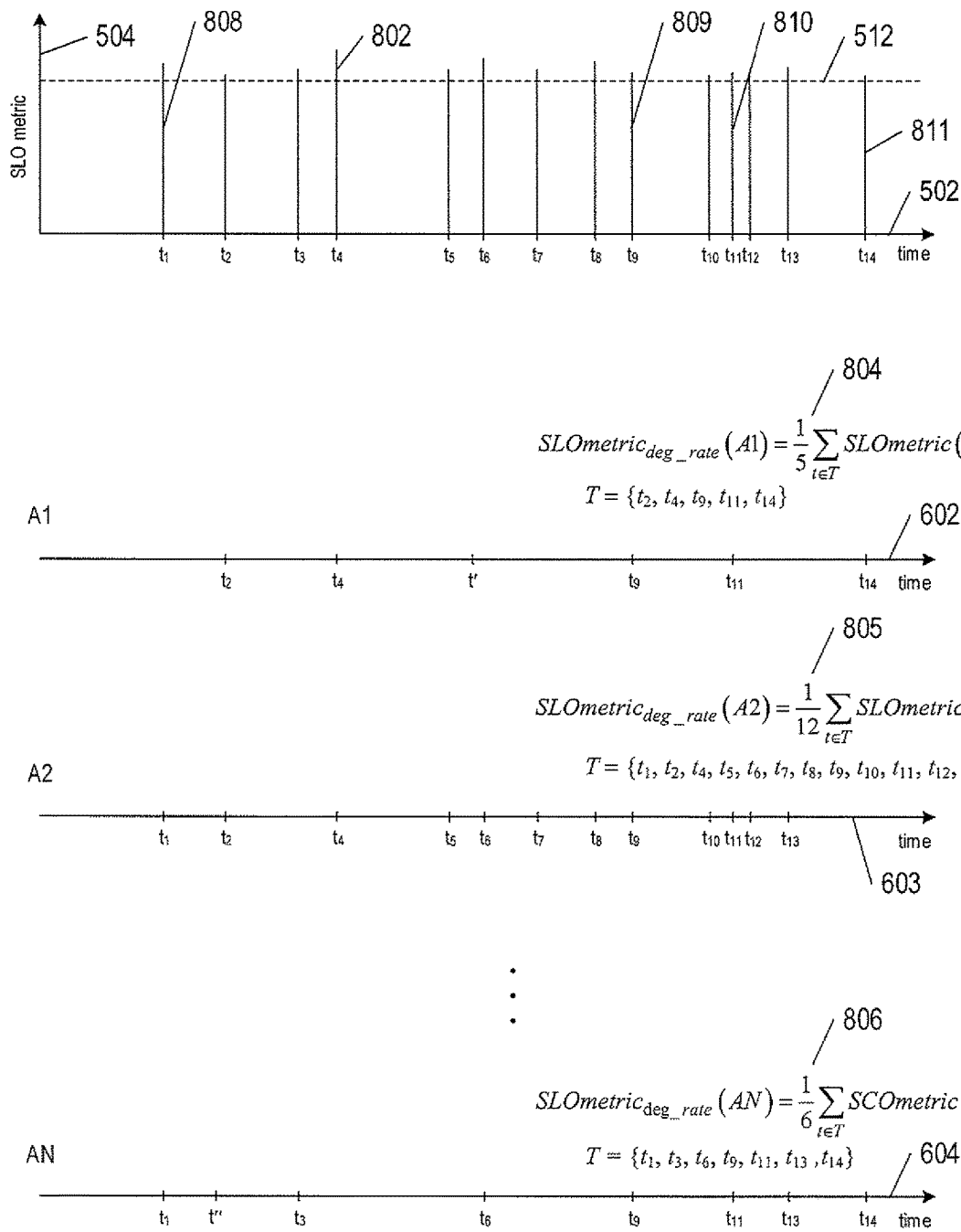
FIG. 8 shows plots of time stamps at which attribute violations of associated attribute thresholds occur and associated SLO metric degradation rages.

FIG. 8 shows a plot of values of the SLO metric that violate the SLO threshold and time axes 602-604 of FIG. 6. Vertical line segments that extend above the SLO threshold represent the values of the SLO metrics that violate the SLO threshold 512 described above with reference to FIG. 5. For example, line segment 802 represents the value of the SLO metric at time stamp $t_4$, $SLOmetric(t_4)$, which is greater than the threshold 512. FIG. 8 also includes equations 804-806 that represent calculation of the SLO metric degradation rate for the attributes A1, A2, and AN in accordance with Equation (3). For example, $SLOmetric_{deg\_rate}(A1)$ is an average of the SLO metric values represented by line segments 802 and 808-811.

For each attribute, a co-occurrence index is calculated. The co-occurrence index as an average number of co-occurring attribute threshold violations between two attributes. The time stamps of the co-occurring attribute threshold violations also coincide with the time stamps of the SLO metric violates the SLO threshold. The co-occurrence index is given by:

$$Co_{index}(An) = \frac{1}{N-1} \sum_{\substack{j=1 \\ j \neq n}}^{N} count(An \cap Aj) \quad (4)$$

where $count(An \cap Aj)$ is the number of time attributes of the attributes An and Aj violate their respective attribute thresholds at the same time stamps.

Figure 9:
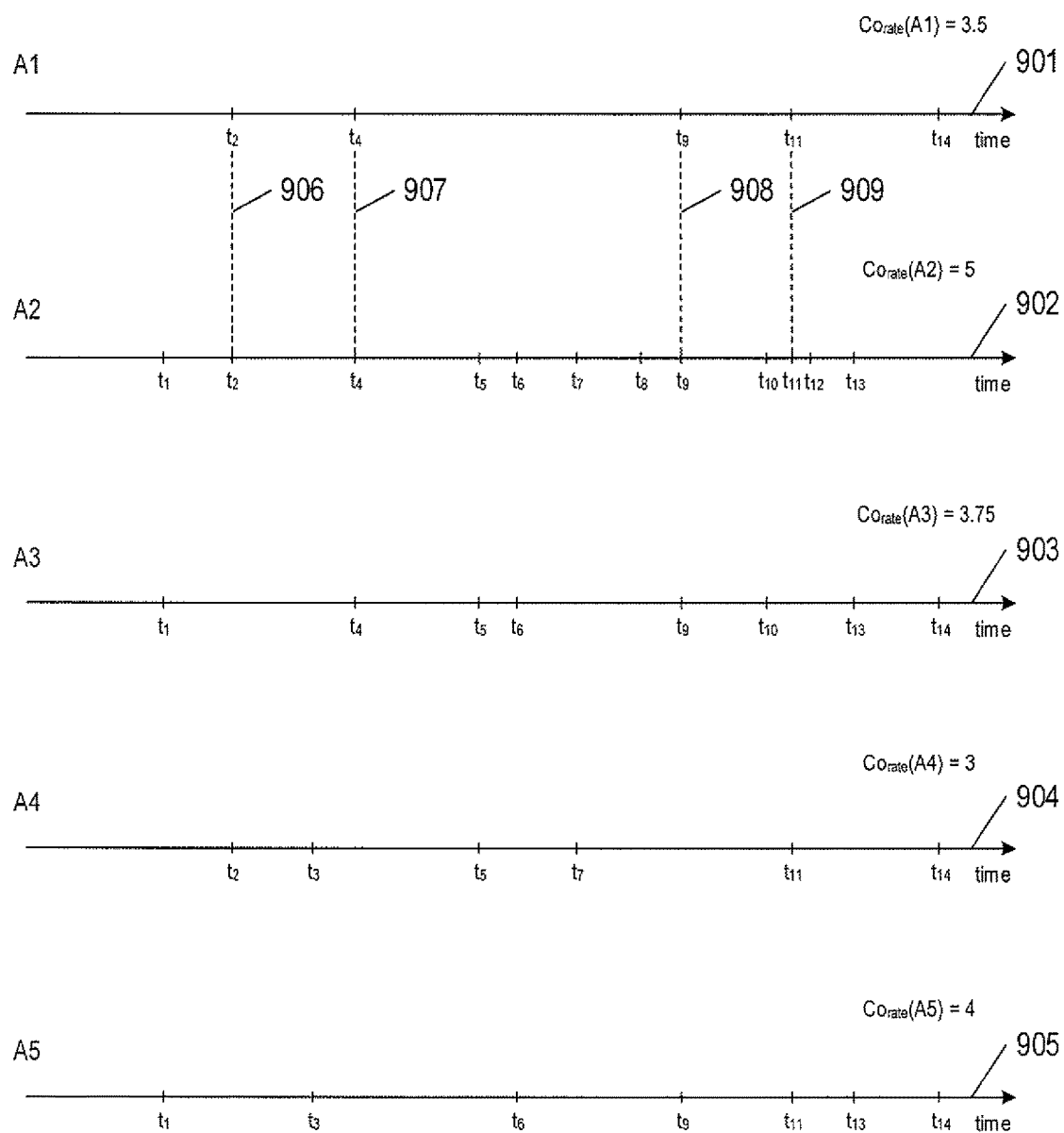
FIG. 9 shows plots of time stamps at which attribute violations of associated attribute thresholds occur and associated co-occurrence indices.

FIG. 9 shows time axes 901-905 of five attributes with time stamps of attributes metric violations of associated attribute thresholds. The time stamps coincide with time stamps of SLO metric violations of the SLO threshold shown in FIG. 5. The $count(A1 \cap A2)=4$ is the number of times the attributes of the attributes A1 and A2 violated their respective attribute thresholds at the same time stamps as indicated by dashed lines 906-909. The quantities count $(A1 \cap A3)$, $count(A1 \cap A4)$, and $count(A1 \cap A5)$ are calculated in the same manner. According to Equation (4), the co-occurrence index is calculated for the attribute A1 as:

$$Co_{index}(A1) = \frac{1}{4}(4+3+3+4) = 3.5$$

The co-occurrence indices associated with the attributes A1, A2, A3, A4, and A5 are presented in FIG. 9.

The participation rate, the SLO metric degradation rate, and the co-occurrence index may be used to identify attributes of interests or interesting attributes. Any one or more of the following conditions may be used to identify an attribute, An, as interesting:

$$Part_{rate}(An) \geq T_P \quad (5a)$$

$$SLOmetric_{deg\_rate}(An) \geq T_{SDR} \quad (5b)$$

$$Co_{index}(An) \geq T_{CO} \quad (5c)$$

where
$T_P$ is the participation rate threshold;
$T_{SDR}$ is the SLO metric degradation rate threshold; and
$T_{CO}$ is the co-occurrence index threshold.

For example, an interesting attribute may be responsible for the SLO degradation of the application.

A rank value of an attribute may be calculated as a function of the participation rate, the SLO metric degradation rate, and the co-occurrence index associated with the attribute as follows:

$$Rank(An) = F(P_{rate}(An), SLOmetric_{deg\_rate}(An), Co_{index}(An)) \quad (6)$$

where F represents a function of the participation rate, the SLO metric degradation rate, and the co-occurrence index. Examples of functions F include $$F(X,Y,Z) = XYZ \quad (7a)$$

$$F(X,Y,Z) = aX + bY + cZ \quad (7b)$$

where
$X = P_{rate}(An);$

Y=SLOmetric$_{deg\_rate}$(An);
Z=Co$_{index}$(An); and
a, b, and c are weights.

Methods apply association analysis in order to determine relationships between attributes called "attribute-association rules" or "fingerprints." Consider attributes A1, A2, ..., AN that are of interest because one or more of their corresponding participation rates, SLO metric degradation rates, and co-occurrence indices satisfy the conditions in Equation (5a)-(5c). Attribute patterns comprising two or more attributes that violate their associated attribute thresholds at the same time stamp are determined. For example, the set of attributes {A1, A2} is an attribute pattern, if attribute A2 violates an attribute threshold at the same time stamp that attribute A1 violates an attribute threshold. A third attribute A3 may be combined with the attributes A1 and A2 to form another attribute pattern {A1, A2, A3} if attribute A3 violates an attribute threshold at the same time stamp the attributes A1 and A2 violate their associated attribute thresholds. The attribute patterns are collected to form a set of attribute patterns.

Figure 10:
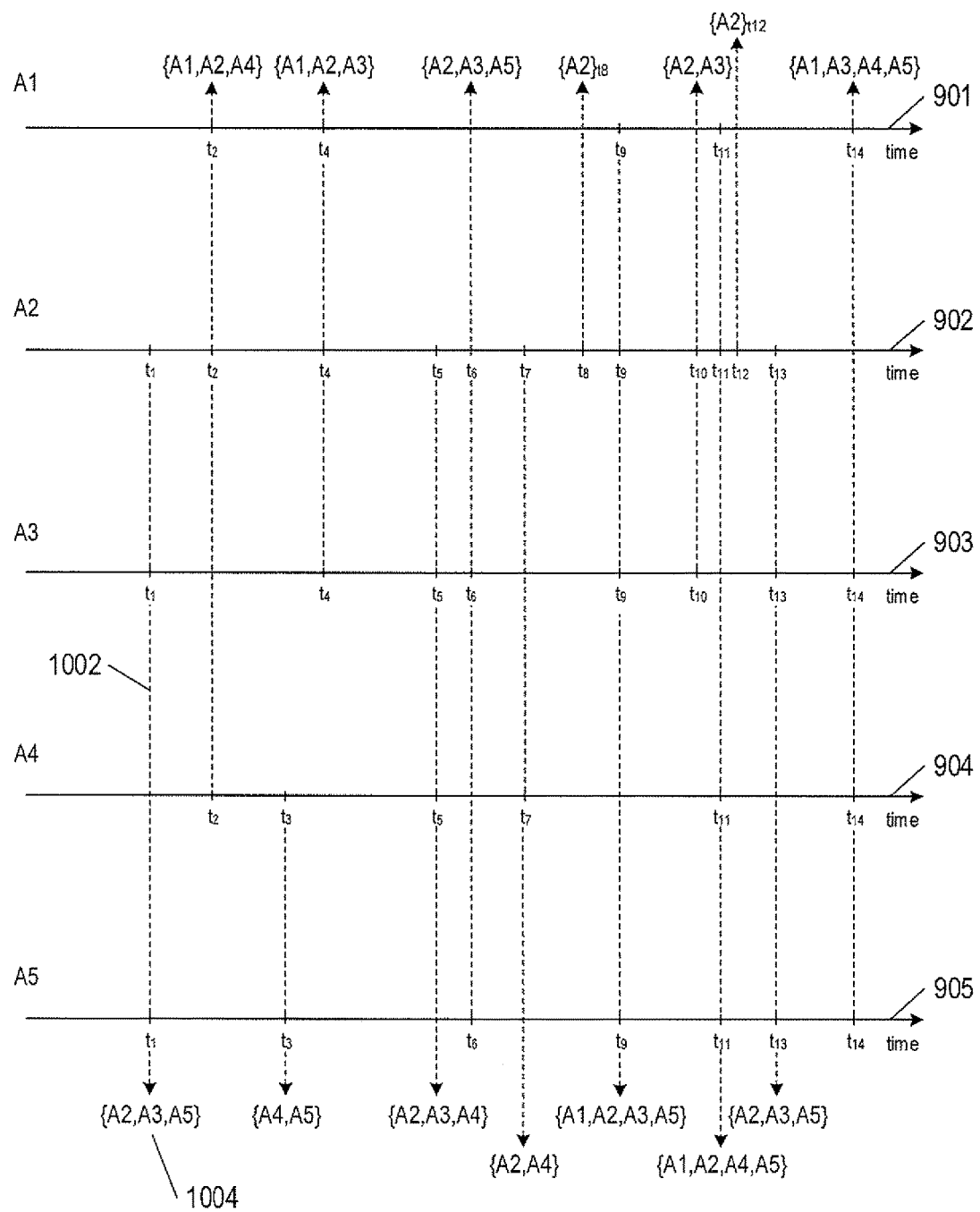
FIG. 10 shows attribute patterns created from five attributes.

FIG. 10 shows attribute patterns created from the five attributes described above with reference to FIG. 9. Dashed directional arrows are used to identify attributes that violate associated attribute thresholds at the same time stamps. For example, dashed directional arrow 1002 indicates that attributes A2, A3, and A5 violate associated attribute thresholds at the same time stamp $t_1$. The attributes A2, A3, and A5 form an attribute pattern {A2, A3, A5} 1004. Note that attribute A2 is the only attribute that violates an associated attribute threshold at the time stamps $t_8$ and $t_{12}$. Therefore, attribute patterns are not formed for the time stamps $t_8$ and $t_{12}$.

Possible combinations of attributes that range from the fewest number of attributes in the set of attribute patterns to the largest number of attributes in the set of attribute patterns created. FIG. 11 shows a table 1102 of the attribute patterns and associated time stamps identified in FIG. 10. The fewest number of attributes in an attribute pattern is two and the largest number of attributes in an attribute pattern is four. Table 1104 is a list of attribute combinations formed from the attributes. Column 1106 list all attribute pairs that can be created from the five attributes A1, A2, A3, A4, and A5; column 1108 list all attribute triplets that can be created from the five attributes A1, A2, A3, A4, and A5; and column 1110 list all attribute quadruplets that can be created from the five attributes A1, A2, A3, A4, and A5.

An attribute-association rule is determined from a pattern probability calculated for each attribute combination. Attribute combinations with an acceptable pattern probability form an attribute-association rule. The pattern probability is calculated as follows:

$$P_{pattern}(\text{attritube comb}) = \frac{freq(\text{attribute comb})}{\text{number of attribute patterns}} \quad (8)$$

where
attribute comb represents an attribute pair, attribute triplet, attribute quadruplet etc.; and
freq(attribute comb) is the number of occurrences of the attribute combination in the attribute patterns of the set of attribute patterns.

When a pattern probability of an attribute combination is greater than an attribute-pattern threshold:

$$P_{pattern}(\text{attribute comb}) \geq T_{pattern} \quad (9)$$

where $T_{pattern}$ is an attribute-pattern threshold, the attribute combination is designated as an attribute-association rule.

Figure 12A:
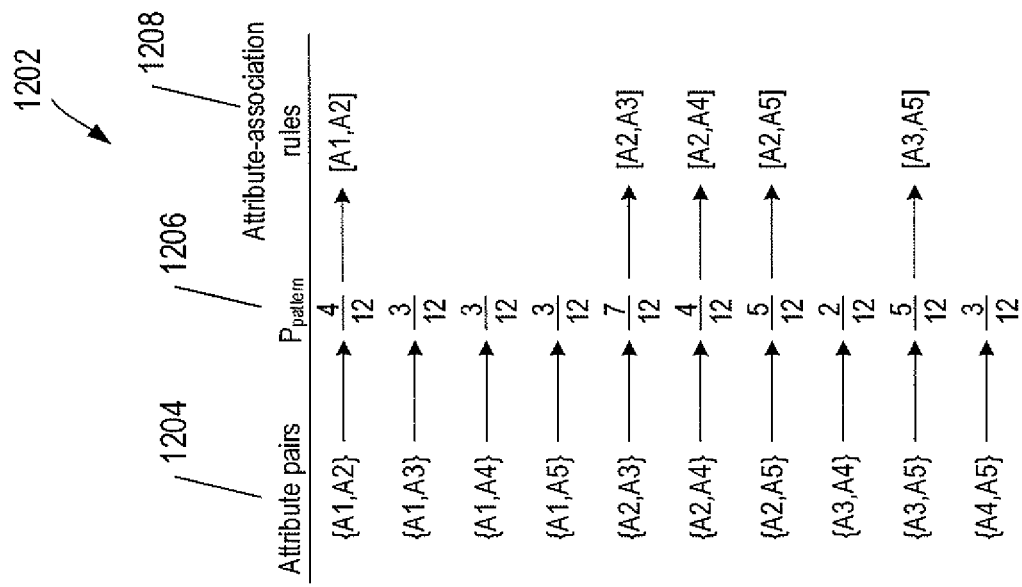

FIGS. 12A-12C show an example of determining attribute-association rules from the attribute patterns and attribute combinations displayed in FIG. 11. In FIG. 12A, table 1202 includes a column of the attribute pairs 1204 of the five attributes A1, A2, A3, A4, and A5. Column 1206 lists the pattern probabilities calculated for each of the attribute pairs listed in column 1204 calculated according to Equation (8). In this example, using an attribute-pattern threshold of $T_{pattern}=4/12$, as described above with reference to Equation (9), gives attribute-association rules [A1, A2], [A2, A3], [A2, A5], and [A3, A5] listed in column 1208. In FIG. 12B, table 1210 includes a column of the attribute triplets 1212 the five attributes A1, A2, A3, A4, and A5. Column 1214 lists the pattern probabilities calculated for each of the attribute triplets according to Equation (8). Using the attribute-pattern threshold of $T_{pattern}=4/12$ as described above with reference to Equation (9) gives only one attribute-association rules [A2, A3, A5] listed in column 1216. In FIG. 12C, table 1218 includes a column of the attribute quadruplets 1220 of the five attributes A1, A2, A3, A4, and A5. Column 1222 lists the pattern probabilities calculated for each of the attribute quadruplets according to Equation (8). None of the pattern probabilities is greater than the attribute-pattern threshold of $T_{pattern}=4/12$. As a result, there are no attribute-association rules for the attribute quadruplets.

The participation rate, SLO metric degradation rate, and co-occurrence rate may be calculated for each attribute-association rules:

$$Part_{rate}(att - ass \text{ rule}) = \frac{count(TS(att - ass \text{ rule}) \cap SLO\_metric\_viol)}{count(SLO\_metric\_viol)} \quad (10)$$

where
att-ass rule is an attribute-association rule of two or more attributes; and
TS(att-ass rule) is the set of time stamps of the attribute-association rule in the time window TI.

For example, in FIG. 7, set of time stamps of the attribute-association rule [A1, A2] is given by:

TS([A1,A2])={$t_1,t_2,t_4,t_5,t_6,t_7,t_8,t_9,t_{10},t_{11},t_{12},t_{13},t_{14}$} which is the full set of time stamps when attributes A1 and A2 violate their associated attribute thresholds. As a result, the participation rate of the attribute-association rule [A1, A2] is Part$_{rate}$(att-ass rule)=0.92.

The SLO metric degradation rate of an attribute-association rule is the maximum of the SLO metric degradation rate of the attributes that form the attribute-association rule:

$$SLOmetric_{deg\_rate}(\text{att-ass rule}) = \max\{SLOmetric_{deg\_rate}(Aj)\}_{j=1}^{J} \quad (11)$$

where SLOmetric$_{deg\_rate}$(Aj) is the SLO metric degradation rate of the jth attribute, Aj, of the attribute-association rule.

The co-occurrence index of an attribute-association rule is the average of the co-occurrence indices of the attributes that form the attribute-association rule:

$$Co_{rate}(att - ass \text{ rule}) = \frac{1}{J}\sum_{j=1}^{J} Co_{rate}(Aj) \quad (12)$$

The participation rate, SLO metric degradation rate, and co-occurrence index of the attribute-association rule may be used to identify attribute-association rules that are of interest based on the same conditions provided in Equations (5a)-(5c). A rank value of an attribute-association rule may be calculated as a function of the participation rate, the SLO metric degradation rate, and the co-occurrence index of the attribute-association rule according to Equations (6)-(7).

Attributes of interest may be combined with attribute-association rules to determine if any additional attribute-association rules can be created. Let $\{Ai\}_{i=1}^{J}$ be a set of attributes in which each attribute has been identified as an attribute of interest based on the conditions for identifying attributes of interest in Equations (5a)-(5c) and/or attribute ranks calculated according to Equations (6)-(7). For each attribute of interest Ai, a conditional probability of an attribute of interest, Ai, with respect to an attribute-association rule may be calculated:

$$P_{con}(Ai \mid att-ass \text{ rule}) = \frac{freq(Ai)}{freq(\text{attributes in } att-ass \text{ rule})} \qquad (13)$$

where
freq(Ai) is the frequency of the attribute Ai in the set of attribute patterns; and
freq(attributes in att-ass rule) is the frequency of the attributes that form the attribute-association rule in the set of attribute patterns.

When the conditional probability satisfied the following condition:

$$P_{con}(Ai \mid att\text{-}ass \text{ rule}) \geq T_R \qquad (14)$$

where $T_R$ is a conditional-probability threshold, the attribute Ai may be combined with the attribute-association rule to create another attribute-association rule. For example, the conditional probability of the attribute A4 with respect to the attribute-association rule [A1, A2] is given by $$P(A4 \mid [A1, A2]) = \frac{freq(A4)}{freq(A1 \text{ and } A2)} = \frac{6}{10+5} = 0.4$$

If the threshold $T_R=0.3$, then an additional attribute-association rule, [A1, A2, A4], is created.

The participation rate, SLO metric degradation rate, and co-occurrence index may be used to identify additional attribute-association rules that are of interest based on the conditions provided in Equations (5a)-(5c). A rank value of an additional attribute-association rule may be calculated as a function of the participation rate, the SLO metric degradation rate, and the co-occurrence index of the additional attribute-association rule according to Equations (6)-(7).

Method described above may be used by data center system administrators to identify those attributes that are highly associated with SLO degradation of a customer's application program and should be added to problem definitions. In other words, a data center customer may be offered to "codify" his/her problems primarily with atomic anomalies based on the attributes and attribute-association rules that are responsible for a decrease in the SLO. As a result, the customer may be forewarned of potentially significant SLO decline in order to prevent unwanted loss and take action to prevent problems whenever the abnormality conditions occur. Moreover, the methods described above employ a machine learning framework that is also able to identify problem attribute patterns in the form of minimum size attribute-association rules that constitute core structures and are highly associated with degradation of the SLO metric of the application program. Identifying also the relevant symptoms that need to be assigned to attributes within the proposed framework may lead to the full definition of alerts in an automatic way.

Figure 13:
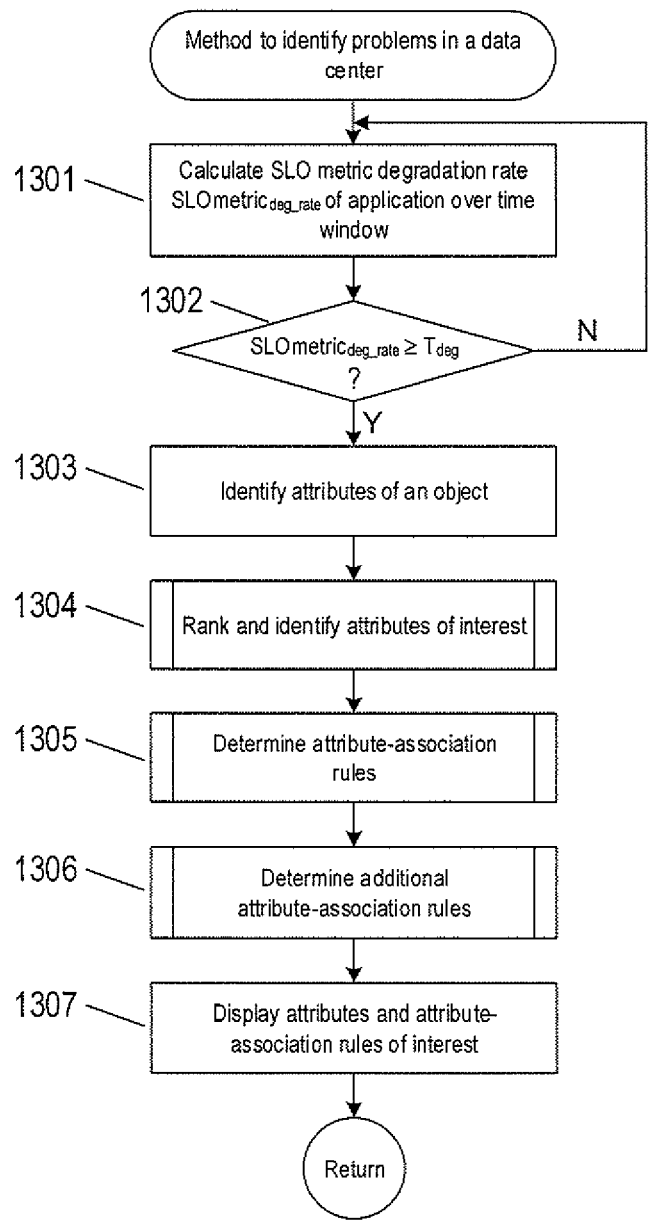
FIG. 13 shows a control-flow diagram of a method to identify problems in a data center.

FIG. 13 shows a control-flow diagram of a method to identify problems in a data center. In block 1301, an SLO metric degradation rate is calculated at time stamps within a time window for an application running in the data center, as described above with reference to Equations (1a)-(1e). In decision block 1302, when the SLO metric degradation rate of the application calculated in block 1301 exceeds an SLO threshold in the time window, control flows to block 1303. In block 1303, attributes of one or more objects used to run the application are identified. The objects may be VMs and/or server computers. In block 1304, a routine "rank and identify attributes of interest" is called to rank the attributes in order of increasing contribution to the SLO degradation rate of the application and identify attributes that are of interest. In block 1305, a routine "determine attribute-association rules" is called determine attribute-association rules comprised of two or more attributes. In block 1306, a routine "determine additional attribute-association rules" is called determine additional attribute-association rules from the attributes and attribute-association rules. In block 1307, the attributes and attribute-association rules that are of interest are displayed.

Figure 14:
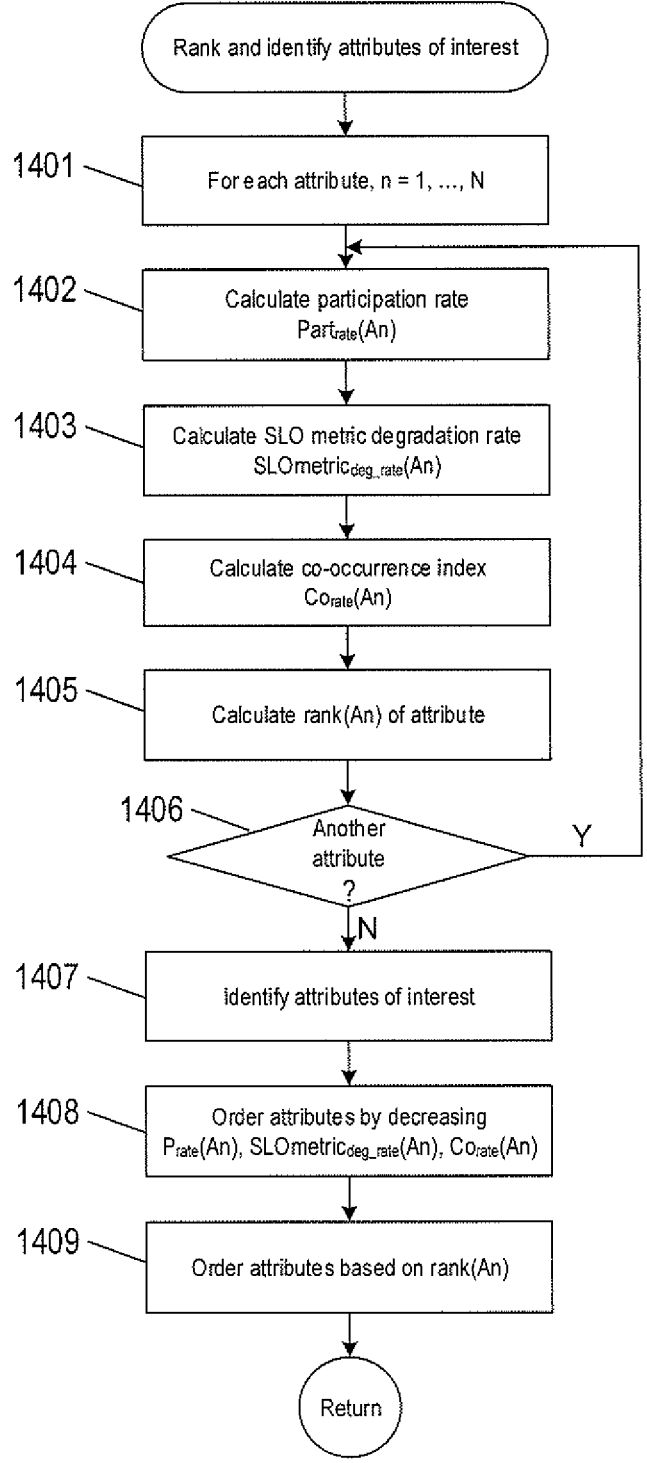
FIG. 14 shows a control-flow diagram of a method to "rank and identify attributes of interest" called in FIG. 13.

FIG. 14 shows a control-flow diagram of a method to "rank and identify attributes of interest" called in block 1304 of FIG. 13. A for-loop beginning with block 1401, repeats the operations represented by blocks 1402-1406. In block 1402, a participation rate is calculated for each attribute as described above with reference to Equation (2) and FIG. 7). In block 1403, a SLO metric degradation rate is calculated for each attribute as described above with reference to Equation (3) and FIG. 8. In block 1404, a co-occurrence index is calculate for each attribute as described above with reference to Equation (4) and FIG. 9). In decision block 1406, the operations represented by blocks 1402-1406 are repeated for another attribute, otherwise, control flows to block 1407. In block 1407, attributes with participation rates, SLO metric degradation rates, and co-occurrence indices that satisfy any one or more of the conditions given in Equation (5a)-(5c) are identified as attributes of interest. In block 1408, a rank value is calculated for each attribute based on the participation rate, SLO metric degradation rate, and co-occurrence index. In block 1409, the attributes are order based on their associated rank values.

Figure 15:
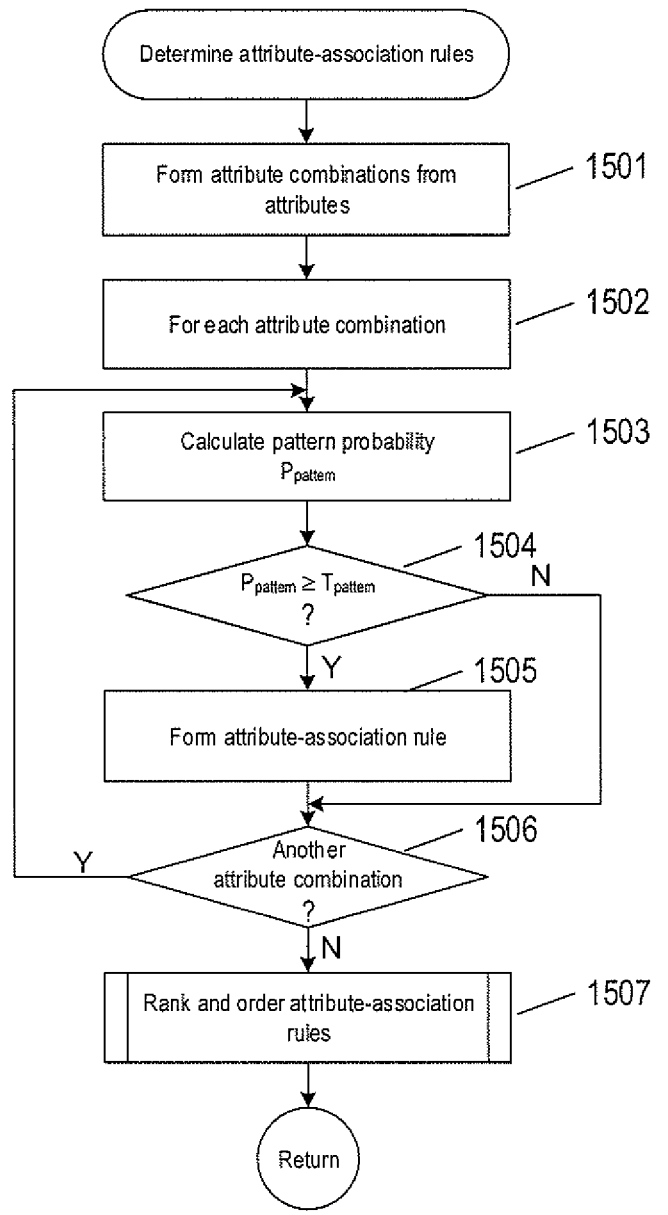
FIG. 15 shows a control-flow diagram of a method to "determine attribute-association rules" called in FIG. 13

FIG. 15 shows a control-flow diagram of a method to "determine attribute-association rules" called in block 1305 of FIG. 13. In block 1501, attribute combinations are formed from the attributes as described above with reference to FIG. 11. A for-loop beginning with block 1502, repeats the operations represented by block 1503-1505 for each attribute combination. In block 1503, a pattern probability is calculated for each attribute combination. In decision block 1504, when the pattern probability is greater than attribute-pattern threshold, an attribute-association rule is created from the pattern combination as described above with reference to FIGS. 12A-12C. In decision block 1506, operations represented by blocks 1503-1505 are repeated for another attribute, otherwise, control flows to block 1507. In decision block 1507, a routine "rank and order attribute-association rules" is called to rank the attribute-association rules and identify attribute-association rules that are of interest.

Figure 16:
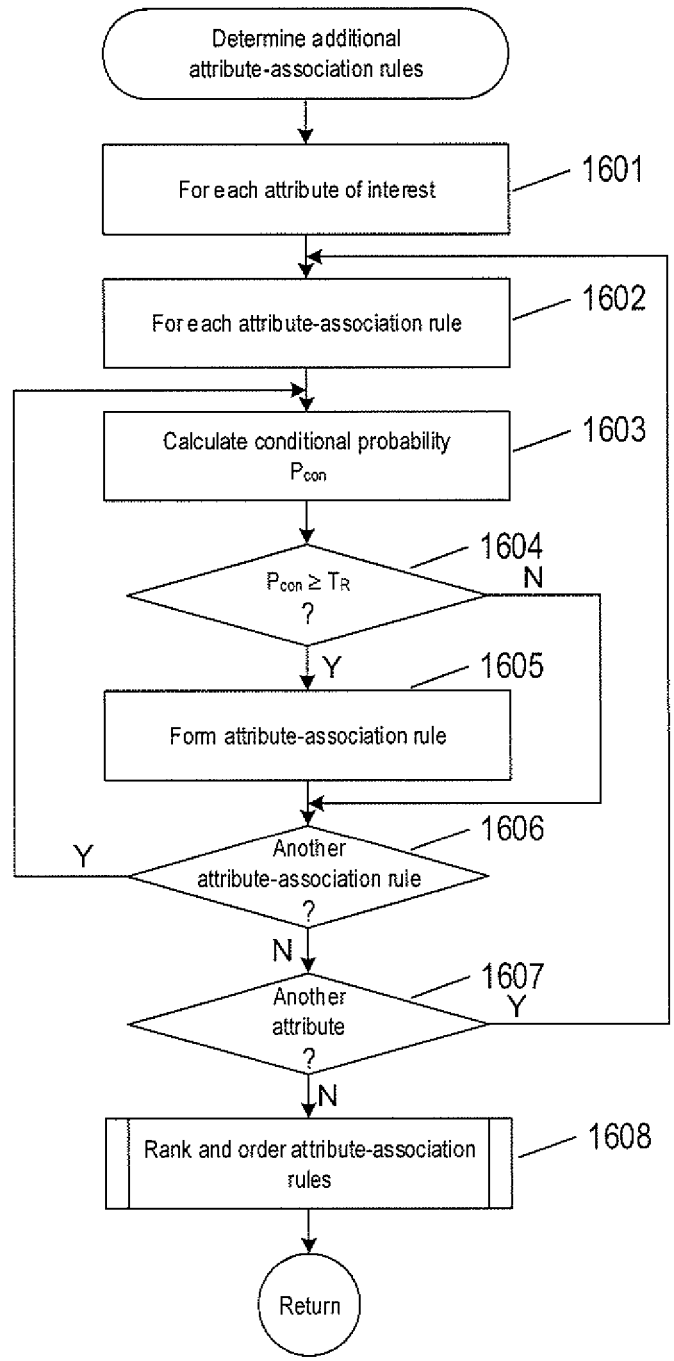
FIG. 16 shows a control-flow diagram of a method to "determine additional attribute-association rules" called in FIG. 13.

FIG. 16 shows a control-flow diagram of a method to "determine additional attribute-association rules" called in block 1306 of FIG. 13. A for-loop beginning with block 1601, repeats the operations represented by block 1602-1607 for each attribute. A for-loop beginning with block 1602, repeats the operations represented by block 1603-1606 for each attribute-association rule. In block 1603, a conditional probability is calculated for each attribute and attribute-association rule as described above with reference to Equation (13). In decision block 1604, when the conditional probability is greater than attribute-combination threshold, an additional attribute-association rule is created from the attribute and the attribute-association rule, as described above with reference to Equation (14), an additional attribute-association rule is created. In decision block 1606, the operations represented by blocks 1603-1605 are repeated for another attribute-association rule, otherwise, control flows to block 1607. In decision block 1607, the operations represented by blocks 1602-1606 are repeated for another attribute, otherwise, control flows to block 1608. In decision block 1608, a routine "rank and order attribute-association rules" is called to rank the additional attribute-association rules and identify attribute-association rules that are of interest.

Figure 17:
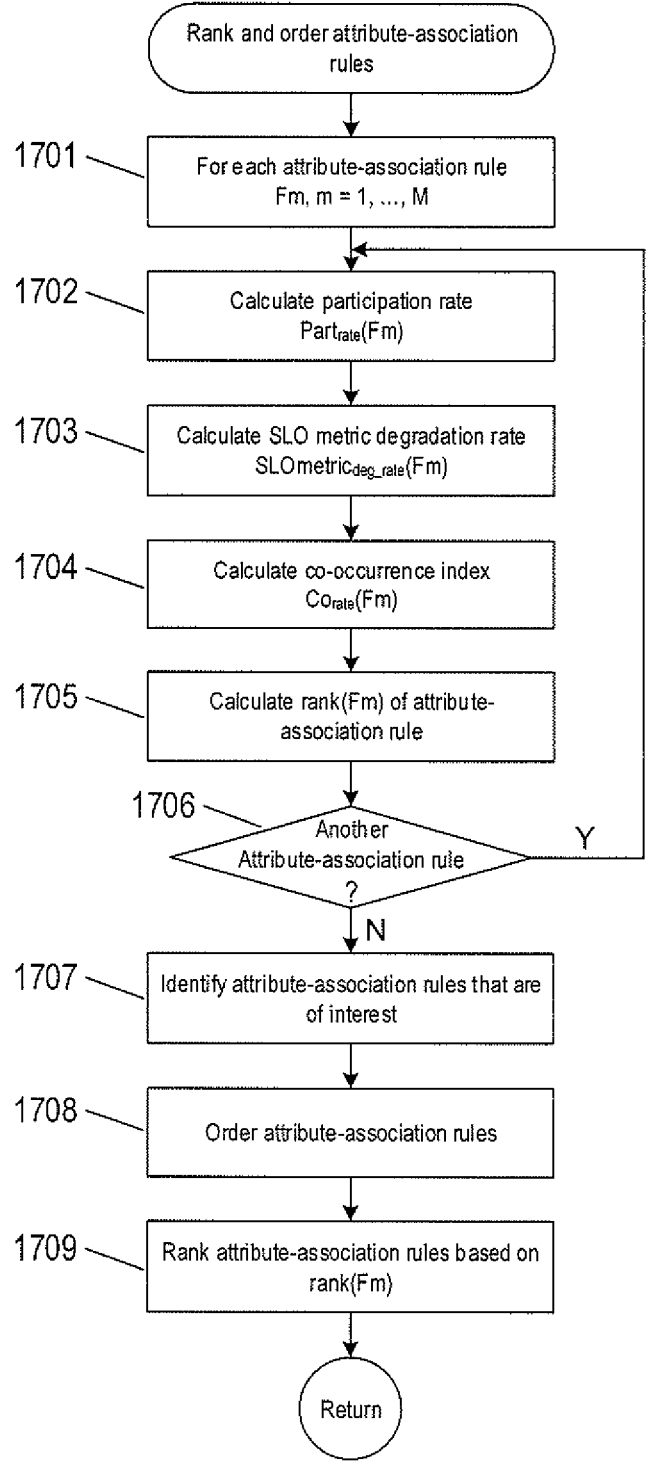
FIG. 17 shows a control-flow diagram of a method to "rank and order attribute-association rules" called in FIGS. 15 and 16.

FIG. 17 shows a control-flow diagram of a method to "rank and order attribute-association rules" called in block 1507 of FIG. 15 and block 1608 of FIG. 16. A for-loop beginning with block 1701, repeats the operations represented by blocks 1702-1706. In block 1702, a participation rate is calculated for each attribute-association rule denoted by Fm, as described above with reference to Equation (10). In block 1703, a SLO metric degradation rate is calculated for each attribute-association rule as described above with reference to Equation (11). In block 1704, a co-occurrence index is calculate for each attribute-association rule as described above with reference to Equation (12). In decision block 1706, the operations represented by blocks 1702-1706 are repeated for another attribute-association rule, otherwise, control flows to block 1707. In block 1707, attribute-association rules with participation rates, SLO metric degradation rates, and co-occurrence indices that satisfy any one or more of the conditions given in Equation (5a)-(5c) are identified as attribute-association rule of interest. In block 1708, a rank value is calculated for each attribute-association rule based on the participation rate, SLO metric degradation rate, and co-occurrence index. In block 1709, the attribute-association rules are order based on their associated rank values.

Figure 18:
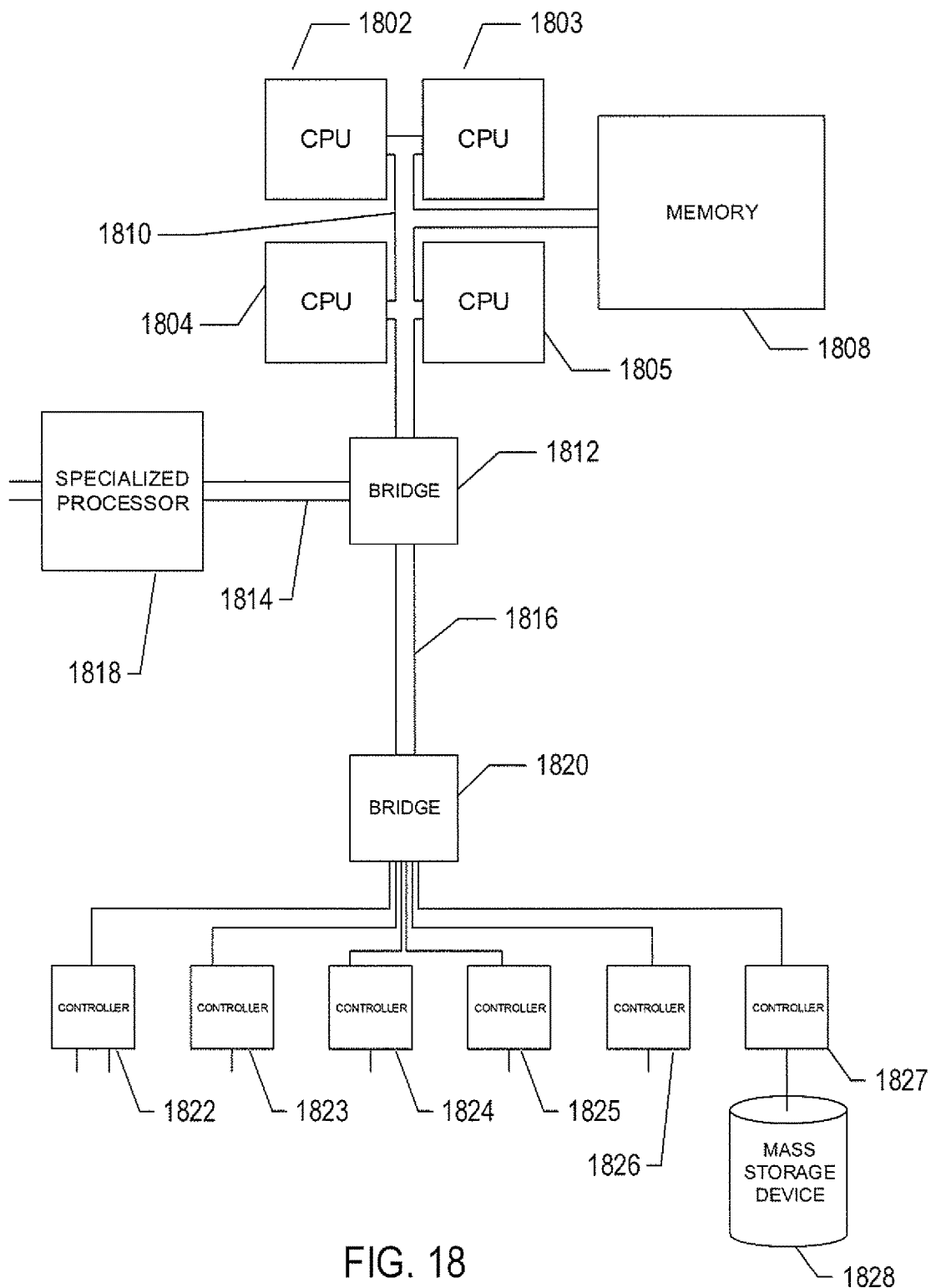
FIG. 18 shows an architectural diagram for various types of computers used to identify problem in a data center.

FIG. 18 shows an architectural diagram for various types of computers that may be used to execute the methods described above. Computers that receive, process, and store event messages may be described by the general architectural diagram shown in FIG. 18, for example. The computer system contains one or multiple central processing units ("CPUs") 1802-1805, one or more electronic memories 1808 interconnected with the CPUs by a CPU/memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. These busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of mass-storage devices 1828, electronic displays, input devices, and other such components, subcomponents, and computational devices. It should be noted that computer-readable data-storage devices include optical and electromagnetic disks, electronic memories, and other physical data-storage devices.

EXPERIMENTAL RESULTS

Experiments were performed on a data center of active usage for the VM objects to investigate attributes of the objects in terms of their individual scores, as well as patterns making attribute-association rules. The input data parameters were 50 VM's with 700 attributes, 86 attributes violated associated thresholds, time window of monitoring metrics was 30 days, and 454,437 threshold violation events were analyzed.

In the experiments, the anomalies score of those VM's in vR Ops as a SLO metric is considered. The anomalies score represents how abnormal the behavior of the object is, based on historical metric data. The anomaly score is calculated as the total number of SLO threshold violations for all metrics of object and any child or lower level objects. The number of metrics of that are violating their dynamic thresholds to determine trends and normal levels of threshold violations. Based on these trends, the Anomalies score is calculated using the total number of threshold violations for all metrics for the selected object and its child objects. A low Anomalies score indicates that an object is behaving in accordance with the object's established historical parameters. Most or all of the object metrics, including the object key performance indicators ("KPIs"), are within their thresholds. Because changes in behavior often indicate developing problems, if the metrics of an object violate calculated thresholds, the anomalies score for the object increases. As more metrics violate associated thresholds, anomalies continue to increase. Violations by KPI metrics increase the Anomalies score more than violations by non-KPI metrics. A low anomalies score indicates that an object is behaving in accordance with its historical normalcy. In other words, most or all of the object metrics are within their respective thresholds. A high number of anomalies usually indicates a problem (statistically) or at least a situation that requires attention. Therefore, within this setting, looking for attributes of interest and attribute-association rules was equivalent to identifying patterns that statistically coincide with other attribute anomalies.

FIG. 19 shows a table of attributes observed in SLO violation with larger than 0.01 participation rate, where the SLO threshold was set to 50 for all 50 VM's. FIG. 20 shows a table of attribute-association rules formed form the top 5 attributes of the table of FIG. 19. In this case, the participation rate of an attribute is measured as a conditional probability of its occurrence over all assembles associated with the SLO degradation rate with equal or larger size. In the meantime, the SLO degradation rate is the the same for nearly every attribute-association rule with the attribute "guestfilesystem|percentage." In general, it is observed that only a few of the attributes are associated with the anomalies score degradation with the specified threshold above. In FIG. 19, a dominant group of attributes was not observed. The attributes have close SLO degradation rates, with some diversity in the co-occurrence index. However, in case of attribute-association rules displayed in FIG. 20, the diversity becomes significant, both in terms of the participation rate, as well as the co-occurrence index, where we see that the attribute-association rules include the attributes
"cpu|usagemhz_average,"
"diskspace|activeNotShared,"
"guestfilesystem|percentage,"
"guestfilesystem|usage," and
"net|bytesTx_average"
determined the maximum number of other attributes. This example demonstrates that there are dangerous combinations of attributes that can result in higher rate of anomaly propagation over the object. FIG. 20 shows a table with some attribute-association rules discovered with the principle of maximum confidence transition represented by the conditional probability in Equation (13). This table reveals that different attributes of "guestfilesystem" that represent various quantifications of the same process, which appears to be a redundant attribute-association rule. However, the attribute-association rule reveals that these attributes have simultaneously generated anomaly events that increased the anomalies score of VM's above the acceptable degree.

There are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method to enhance identification of problems in a data center, the method comprising:
    calculating a service level objective ("SLO") degradation rate of an application program running in the data center in a time window;
    identifying attributes of an object that runs the application program when the SLO degradation rate violates an SLO threshold;
    ranking and identifying attributes of interest based on the SLO degradation rate of the application and attribute violations of associated attribute thresholds;
    determining attribute-association rules based on combinations of the attributes of interest; and
    ranking and identifying attribute-association rules of interest,
    wherein ranking and identifying the attributes of interest further comprises:
    for each attribute,
        calculating a participation rate as a fraction of attribute threshold violations relative to a total number of SLO metric violations,
        calculating an SLO metric degradation rate as an average value of the SLO metric at time stamps when both SLO metric of the application program violates the SLO threshold and the attribute violates the associated attribute threshold,
        calculating a co-occurrence index as an average number of co-occurring attribute threshold violations between two attributes,
        calculating a rank value of the attribute as a function of the attribute participation rate, SLO metric degradation rate, and co-occurrence index, and
        identifying the attribute as an attribute of interest when one or more of the participation rate, SLO metric degradation rate, and co-occurrence index is greater than one or more of a corresponding participation rate threshold, SLO metric degradation rate threshold, and co-occurrence index threshold; and
    ordering the attributes based on each attribute's associated rank value.

2. The method of claim 1, wherein determining the attribute-association rules further comprises:
    forming attribute combinations from the attributes;
    forming a set of attribute patterns from attributes that violate associated attribute threshold at the same time stamps; and
    for each attribute combination,
        calculating a pattern probability as a fraction of a number of occurrences of the attribute combination in attribute patterns of the set of attribute patterns; and
        forming an attribute-association rule for the attribute combination with the pattern probability that is greater than an attribute-pattern threshold.

3. The method of claim 2, further comprising:
    for each attribute of interest,
        for each attribute-association rule,
            calculating a conditional probability as a fraction of a frequency of the attribute of interest in the set of attribute patterns and a frequency of the attributes that form the attribute-association rule in the set of attribute patterns; and
            forming an additional attribute-association rule from the attribute of interest and attribute-association rule when the conditional probability is greater than a conditional-probability threshold.

4. The method of claim 1, wherein calculating the SLO degradation rate of the application comprises calculating a sum of SLO performance metrics.

5. The method of claim 1, wherein ranking and identifying attribute-association rules of interest further comprises:
    for each attribute-association rule,
        calculating a second participation rate as a fraction of occurrences of attribute threshold violations for attributes that form the attribute-association rule relative to the total number of SLO metric violations;
        calculating a second SLO metric degradation rate as a maximum of the SLO metric degradation rates of the attributes that form the attribute-association rule;

calculating a second co-occurrence index as an average of the co-occurrence rate of the attributes that form the attribute-association rule;

calculating a second rank value of the attribute-association rule as a function of the participation rate, the SLO metric degradation rate, and the co-occurrence index; and identifying the attribute-association rule as an attribute of interest when one or more of the second participation rate, second SLO metric degradation rate, and second co-occurrence index is greater than one or more of a corresponding participation rate threshold, SLO metric degradation rate threshold, and co-occurrence index threshold; and ordering the attribute-association rules based on each attribute-association rule's associated rank value.

6. A system to enhance identification of problems in a data center, the system comprising:

one or more processors;

one or more data-storage devices; and machine-readable instructions stored in the one or more data-storage devices that when executed using the one or more processors controls the system to carry out calculating a service level objective ("SLO") degradation rate of an application program running in the data center in a time window;

identifying attributes of an object that runs the application program when the SLO degradation rate violates an SLO threshold;

ranking and identifying attributes of interest based on the SLO degradation rate of the application and attribute violations of associated attribute thresholds;

determining attribute-association rules based on combinations of the attributes of interest; and ranking and identifying attribute-association rules of interest, wherein determining the attribute-association rules further comprises:

forming attribute combinations from the attributes;

forming a set of attribute patterns from attributes that violate associated attribute threshold at the same time stamps;

for each attribute combination, calculating a pattern probability as a fraction of a number of occurrences of the attribute combination in attribute patterns of the set of attribute patterns; and forming an attribute-association rule for the attribute combination with the pattern probability that is greater than an attribute-pattern threshold.

7. The system of claim 6, wherein calculating the SLO degradation rate of the application comprises calculating a sum of SLO performance metrics.

8. The system of claim 6, wherein ranking and identifying the attributes of interest further comprise:

for each attribute, calculating a participation rate as a fraction of attribute threshold violations relative to a total number of SLO metric violations of the SLO threshold, calculating an SLO metric degradation rate as an average value of the SLO metric at time stamps when both SLO metric of the application program violates the SLO threshold and the attribute violates the associated attribute threshold, calculating a co-occurrence index as an average number of co-occurring attribute threshold violations between two attributes, calculating a rank value of the attribute as a function of the attribute participation rate, SLO metric degradation rate, and co-occurrence index, and identifying the attribute as an attribute of interest when one or more of the participation rate, SLO metric degradation rate, and co-occurrence index is greater than one or more of a corresponding participation rate threshold, SLO metric degradation rate threshold, and co-occurrence index threshold; and ordering the attributes based on each attribute's associated rank value.

9. The system of claim 6, further comprising:

for each attribute of interest, for each attribute-association rule, calculating a conditional probability as a fraction of a frequency of the attribute of interest in the set of attribute patterns and a frequency of the attributes that form the attribute-association rule in the set of attribute patterns; and forming an additional attribute-association rule from the attribute of interest and attribute-association rule when the conditional probability is greater than a conditional-probability threshold.

10. The system of claim 6, wherein ranking and identifying attribute-association rules of interest further comprises:

for each attribute-association rule, calculating a participation rate as a fraction of occurrences of attribute threshold violations for attributes that form the attribute-association rule relative to the total number of SLO metric violations of the SLO threshold;

calculating an SLO metric degradation rate as a maximum of the SLO metric degradation rates of the attributes that form the attribute-association rule;

calculating a co-occurrence index as an average the co-occurrence rate of the attributes that form the attribute-association rule;

calculating a rank value of the attribute-association rule as a function of the participation rate, the SLO metric degradation rate, and the co-occurrence index; and identifying the attribute-association rule as an attribute of interest when one or more of the participation rate, SLO metric degradation rate, and co-occurrence index is greater than one or more of a corresponding participation rate threshold, SLO metric degradation rate threshold, and co-occurrence index threshold; and ordering the attribute-association rules based on each attribute-association rule's associated rank value.

11. A non-transitory, computer-readable medium encoded with machine-readable instructions that implement a method carried out by one or more processors of a computer system to perform the operations of:

calculating a service level objective ("SLO") degradation rate of an application program running in the data center in a time window;

identifying attributes of an object that runs the application program when the SLO degradation rate violates an SLO threshold;

ranking and identifying attributes of interest based on the SLO degradation rate of the application and attribute violations of associated attribute thresholds;

determining attribute-association rules based on combinations of the attributes of interest; and ranking and identifying attribute-association rules of interest, wherein ranking and identifying attribute-association rules of interest further comprises:

for each attribute-association rule,
calculating a participation rate as a fraction of occurrences of attribute threshold violations for attributes that form the attribute-association rule relative to the total number of SLO metric violations of the SLO threshold;

calculating an SLO metric degradation rate as a maximum of the SLO metric degradation rates of the attributes that form the attribute-association rule;

calculating a co-occurrence index as an average the co-occurrence rate of the attributes that form the attribute-association rule;

calculating a rank value of the attribute-association rule as a function of the participation rate, the SLO metric degradation rate, and the co-occurrence index; and identifying the attribute-association rule as an attribute of interest when one or more of the participation rate, SLO metric degradation rate, and co-occurrence index is greater than one or more of a corresponding participation rate threshold, SLO metric degradation rate threshold, and co-occurrence index threshold; and ordering the attribute-association rules based on each attribute-association rule's associated rank value.

12. The medium of claim 11, wherein determining the attribute-association rules further comprises:

forming attribute combinations from the attributes;

forming a set of attribute patterns from attributes that violate associated attribute threshold at the same time stamps; and for each attribute combination,
calculating a pattern probability as a fraction of a number of occurrences of the attribute combination in attribute patterns of the set of attribute patterns; and forming an attribute-association rule for the attribute combination with the pattern probability that is greater than an attribute-pattern threshold.

13. The medium of claim 12, further comprising:

for each attribute of interest,
for each attribute-association rule,
calculating a conditional probability as a fraction of a frequency of the attribute of interest in the set of attribute patterns and a frequency of the attributes that form the attribute-association rule in the set of attribute patterns; and forming an additional attribute-association rule from the attribute of interest and attribute-association rule when the conditional probability is greater than a conditional-probability threshold.

14. The medium of claim 11, wherein calculating the SLO degradation rate of the application comprises calculating a sum of SLO performance metrics.

15. The medium of claim 11, wherein ranking and identifying the attributes of interest further comprise:

for each attribute,
calculating a second participation rate as a fraction of occurrences of attribute threshold violations relative to a total number of SLO metric violations of the SLO threshold, calculating a second SLO metric degradation rate as an average value of the SLO metric at time stamps when both SLO metric of the application program violates the SLO threshold and the attribute violates the associated attribute threshold, calculating a second co-occurrence index as an average number of co-occurring attribute threshold violations between two attributes, calculating a second rank value of the attribute as a function of the attribute participation rate, SLO metric degradation rate, and co-occurrence index, and identifying the attribute as an attribute of interest when one or more of the second participation rate, second SLO metric degradation rate, and second co-occurrence index is greater than one or more of a corresponding participation rate threshold, SLO metric degradation rate threshold, and co-occurrence index threshold; and ordering the attributes based on each attribute's associated rank value.

* * * * *